United States Patent
Gheen

(10) Patent No.: US 11,336,946 B1
(45) Date of Patent: May 17, 2022

(54) PRESENTING OPTIONS FOR SELECTING CONTENT VIA NAVIGATION BARS AND DESIGNATED CONTENT SPACES

(71) Applicant: Amazon Technologies, Inc., Seattle, WA (US)

(72) Inventor: Brandon Gheen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/997,881

(22) Filed: Aug. 19, 2020

(51) Int. Cl.
| | |
|---|---|
| H04N 21/422 | (2011.01) |
| H04N 21/475 | (2011.01) |
| H04N 21/482 | (2011.01) |
| H04N 21/485 | (2011.01) |
| G06F 3/0485 | (2022.01) |
| H04N 21/4363 | (2011.01) |
| G06F 3/04855 | (2022.01) |
| G06F 3/04817 | (2022.01) |
| G06F 3/04842 | (2022.01) |
| G06F 3/0481 | (2022.01) |
| G06F 3/0484 | (2022.01) |

(52) U.S. Cl.
CPC ... *H04N 21/42216* (2013.01); *G06F 3/04817* (2013.01); *G06F 3/04842* (2013.01); *G06F 3/04855* (2013.01); *H04N 21/43635* (2013.01); *H04N 21/43637* (2013.01); *H04N 21/4756* (2013.01); *H04N 21/4821* (2013.01); *H04N 21/4858* (2013.01)

(58) Field of Classification Search
CPC ....... H04N 21/42216; H04N 21/43635; H04N 21/43637; H04N 21/4756; H04N 21/4821; H04N 21/4858; G06F 3/04817; G06F 3/0482; G06F 3/04855

See application file for complete search history.

(56) References Cited

U.S. PATENT DOCUMENTS

| | | |
|---|---|---|
| 5,187,776 A | 2/1993 | Yanker |
| 5,754,850 A | 5/1998 | Janssen |
| D395,426 S | 6/1998 | Chiba |

(Continued)

OTHER PUBLICATIONS

Coates, J., "The Chicago James Coates Computers column," Knight-Ridder Tribune Business News—Chicago Tribune—Illinois, Feb. 20, 2006, 2 pages.

(Continued)

*Primary Examiner* — Sumaiya A Chowdhury
(74) *Attorney, Agent, or Firm* — Athorus, PLLC

(57) ABSTRACT

User interfaces having navigation bars are rendered on displays by streaming devices or smart applications operating on the displays. The navigation bars include selectable elements corresponding to applications that are preferred or designated users, as well as promoted applications, or utility applications. Placing a cursor or selection element over one of the elements for an application within the navigation bar causes selected content to be displayed above the navigation bar, along with discrete tiles including images associated with the application below the navigation bar. Moving the cursor above or below the navigation bar allows a user to activate the selected content or select one of the discrete tiles. Icons within the navigation bar may be displayed to a user in a predetermined order, at random, or in an order selected by the user.

20 Claims, 25 Drawing Sheets

(56) References Cited

U.S. PATENT DOCUMENTS

| | | | |
|---|---|---|---|
| D403,313 S | 12/1998 | Peppel | |
| 5,889,517 A | 3/1999 | Ueda et al. | |
| D418,120 S | 12/1999 | Okura et al. | |
| D418,495 S | 1/2000 | Brockel et al. | |
| D427,574 S | 7/2000 | Sawada et al. | |
| 6,101,480 A | 8/2000 | Conmy et al. | |
| 6,268,854 B1 | 7/2001 | Borden et al. | |
| 6,288,702 B1 | 9/2001 | Tachibana et al. | |
| 6,320,602 B1 | 11/2001 | Burkardt et al. | |
| D459,360 S | 6/2002 | Leon et al. | |
| D470,857 S | 2/2003 | Anderson et al. | |
| D474,778 S | 5/2003 | Barnes | |
| 6,678,891 B1 | 1/2004 | Wilcox et al. | |
| 6,798,630 B1 | 9/2004 | Vecchio et al. | |
| RE38,609 E | 10/2004 | Chen et al. | |
| D513,511 S | 1/2006 | Decombe | |
| 6,983,420 B1 | 1/2006 | Itou et al. | |
| 7,058,902 B2 | 6/2006 | Iwema et al. | |
| D528,553 S | 9/2006 | Nevill-Manning et al. | |
| D528,556 S | 9/2006 | Decombe | |
| D529,036 S | 9/2006 | Koch et al. | |
| D529,037 S | 9/2006 | Koch et al. | |
| D529,509 S | 10/2006 | Stabb | |
| D529,920 S | 10/2006 | Nevill-Manning et al. | |
| D530,336 S | 10/2006 | Thomsen | |
| D534,543 S | 1/2007 | Gusmorino et al. | |
| D541,291 S | 4/2007 | Zhou et al. | |
| D546,336 S | 7/2007 | Vong et al. | |
| D548,743 S | 8/2007 | Takahashi et al. | |
| D554,652 S | 11/2007 | Shen et al. | |
| D554,654 S | 11/2007 | Waldeck | |
| D573,602 S | 7/2008 | Scott et al. | |
| 7,551,187 B2 | 6/2009 | Agrawala et al. | |
| 7,580,867 B2 | 8/2009 | Nykamp | |
| 7,603,367 B1 | 10/2009 | Kanter et al. | |
| 7,882,156 B2 | 2/2011 | Wykes et al. | |
| 2002/0042755 A1 | 4/2002 | Kumar et al. | |
| 2002/0087558 A1 | 7/2002 | Bailey et al. | |
| 2002/0138481 A1 | 9/2002 | Aggarwal et al. | |
| 2003/0046700 A1 | 3/2003 | Wilcox et al. | |
| 2003/0050844 A1 | 3/2003 | Ruppelt et al. | |
| 2003/0090474 A1 | 5/2003 | Schaefer | |
| 2003/0169302 A1 | 9/2003 | Davidsson et al. | |
| 2004/0083239 A1 | 4/2004 | Cookson et al. | |
| 2004/0117271 A1 | 6/2004 | Knight et al. | |
| 2006/0064652 A1 | 3/2006 | Ahokas | |
| 2006/0179027 A1 | 8/2006 | Bechtel et al. | |
| 2006/0184613 A1 | 8/2006 | Stienessen et al. | |
| 2006/0291737 A1 | 12/2006 | Yamada | |
| 2006/0291738 A1 | 12/2006 | Gong | |
| 2008/0012863 A1 | 1/2008 | Finn et al. | |
| 2009/0064018 A1 | 3/2009 | Horvitz et al. | |
| 2009/0132943 A1 | 5/2009 | Minsky et al. | |
| 2009/0249405 A1* | 10/2009 | Karaoguz | H04N 21/6582 725/62 |
| 2018/0192114 A1* | 7/2018 | Sirpal | G06F 3/0484 |
| 2019/0372988 A1* | 12/2019 | Schirdewahn | G06F 13/4027 |

OTHER PUBLICATIONS

Finnegan, F., "Questions and Answers: Windows," Microsoft Systems Journal, vol. 7, No. 2, p. 103, Mar.-Apr. 1992, 4 pages.

Girishankar, S., "Build the E-Commerce Catalog—New Content-Management Tools Bring Together Disparate Data Formats and Item Descriptions," InformationWeek, 74, Nov. 1999, 4 pages.

Screenshot from the Office for Harmonization in the Internal Market website, (http://oami.europa.eu/RCDOnline/RequestManager) dated Mar. 25, 2008, 2 pages.

Smith, A., "A New Look for Solid Modeling," Computer-aided Engineering, vol. 15, No. 4, pp. 19-24, Apr. 1996, 4 pages.

* cited by examiner

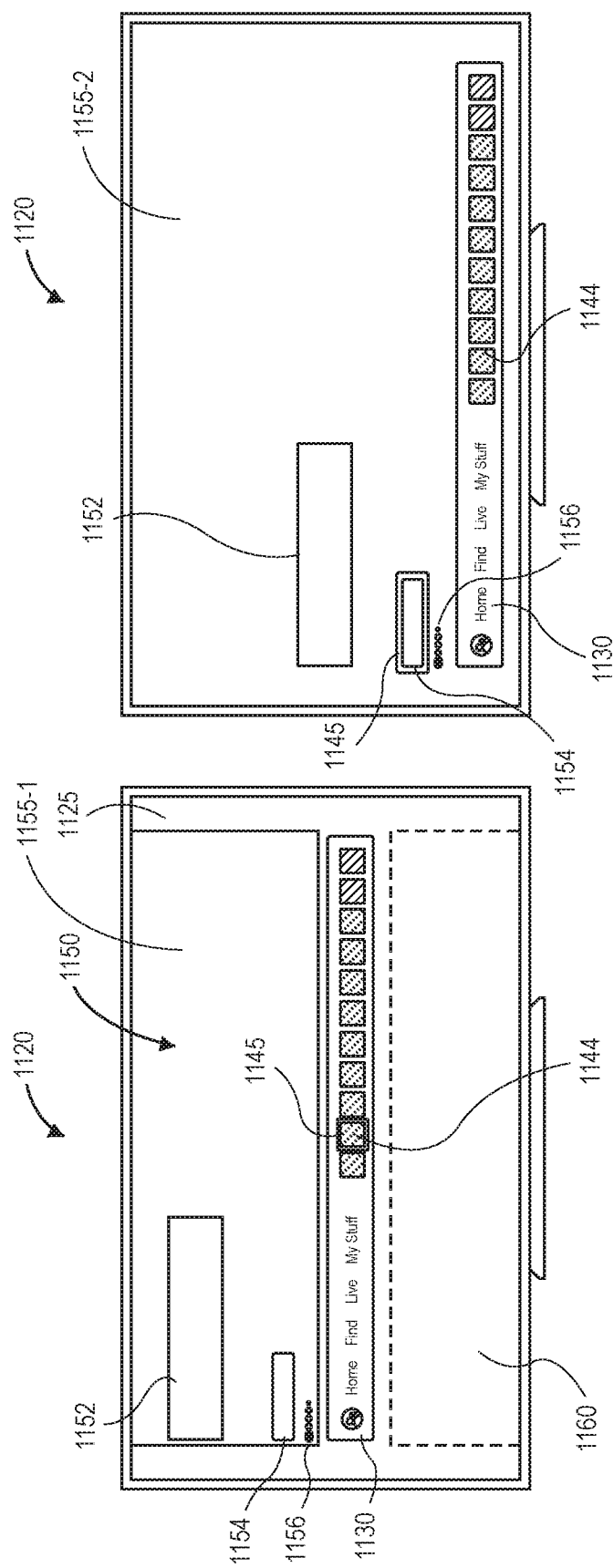

PRESENTING OPTIONS FOR SELECTING CONTENT VIA NAVIGATION BARS AND DESIGNATED CONTENT SPACES

BACKGROUND

Originally, owners or users of television systems were required to operate one or more dials, buttons, switches or other operators provided on such systems in order to select a program to be displayed on a television screen. Television programs were typically transmitted over the air to such systems from terrestrial antennas, and on analog channels residing at designated frequencies within very high frequency (or "VHF") or ultrahigh frequency (or "UHF") levels or bands. Subsequently, advancements in wired or wireless control systems enabled users to select an analog channel, change a level of volume, or otherwise configure or manipulate the operation of a television system, or to turn the television on or off, from the comfort of their chairs or sofas.

Eventually, cable television emerged as an efficient, antenna-free manner for delivering programming to television systems using radiofrequency signals over a coaxial cable, via a converter box. The advent of digital television and digitally encoded programming greatly increased both the number of programs that could be simultaneously made available to a television system, e.g., by cable television, via satellite, or over the Internet, and the levels of resolution at which such programs could be displayed. Furthermore, as network connectivity improved over time, and media streaming features became available as free-standing systems and internal components of television systems, users are now able to access programming from a variety of platforms via a single user interface. For example, users may browse through or search for programs via interactive computer-like pages, menus or other options, and select such programs for display on their television systems.

BRIEF DESCRIPTION OF THE DRAWINGS

FIGS. 11A and 11B are views of aspects of one system for presenting options for selecting content in accordance with implementations of the present disclosure.

FIGS. 12A through 12E are views of aspects of one system for presenting options for selecting content in accordance with implementations of the present disclosure.

DETAILED DESCRIPTION

As is set forth in greater detail below, the present disclosure is directed to systems and methods for presenting options for selecting content via navigation bars and designated content spaces. More specifically, the systems and methods of the present disclosure are directed to systems and methods that enable users to select, access or activate one or more browse destinations, content sources or utility applications from a common interface, which may be provided in a horizontal orientation, and substantially centrally within a display, or in any other orientation or location on the display. The navigation bars may include any number of elements such as icons, buttons, sets of text, calls-to-action or other selectable features corresponding to browse destinations (e.g., system-defined functions for operating a video management system or personal device, such as to browse or search for content integrated into the navigation bars, for selecting or changing a profile of a user, for accessing user-owned or user-controlled content, or for returning to a "home" screen or default configuration), content sources (e.g., system-defined or customer-defined applications, inputs, services or other content sources that are presented in their own user interface and context) or utility applications (e.g., system-defined applications for purchasing one or more other applications or access to one or more content sources, or for changing one or more settings), or any other applications or features.

Additionally, content may be rendered in spaces above or below the navigation bar, including but not limited to images or video content that are specifically selected for a given user, as well as tiles (or images, thumbnails, windows or other visual features) depicting content that is relevant to a particular context or otherwise supplements other content rendered on a display. Moreover, a position or orientation of the navigation bar may change to expand or contract one or more of such spaces, in order to increase an available area for activating an application or otherwise rendering content, or to increase a number of tiles or other tools for presenting contextual or supplemental content to users.

Furthermore, upon activating an application for presenting audio or visual content to a user, the navigation bar and any other information or data may be cleared from the display until a presentation of the audio or visual content is complete, when the presentation of the navigation bar or other information or data may be restored to the display.

Figure 1A:
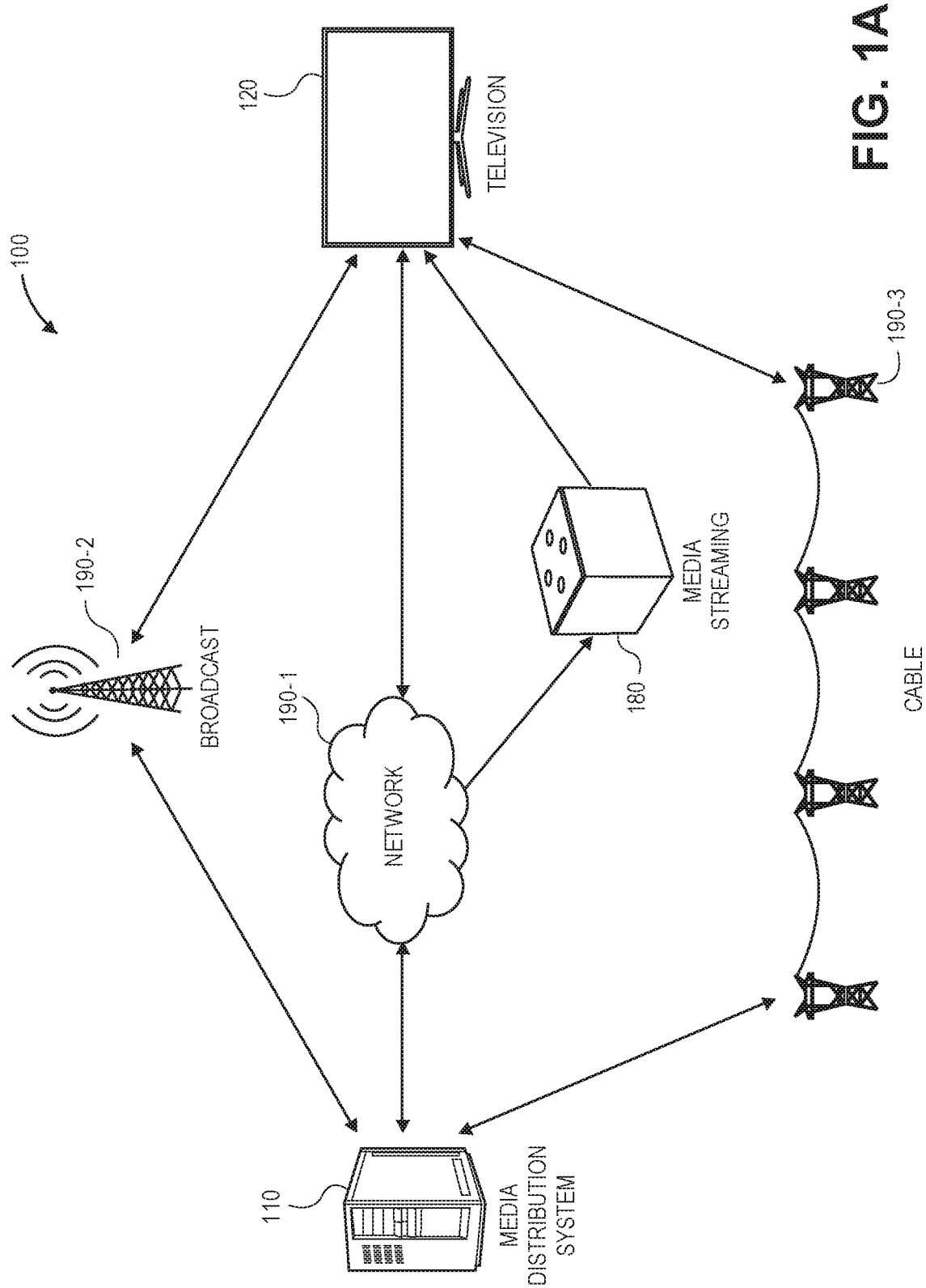
FIGS. 1A and 1B are views of aspects of one system for presenting options for selecting content in accordance with implementations of the present disclosure.
Figure 1B:
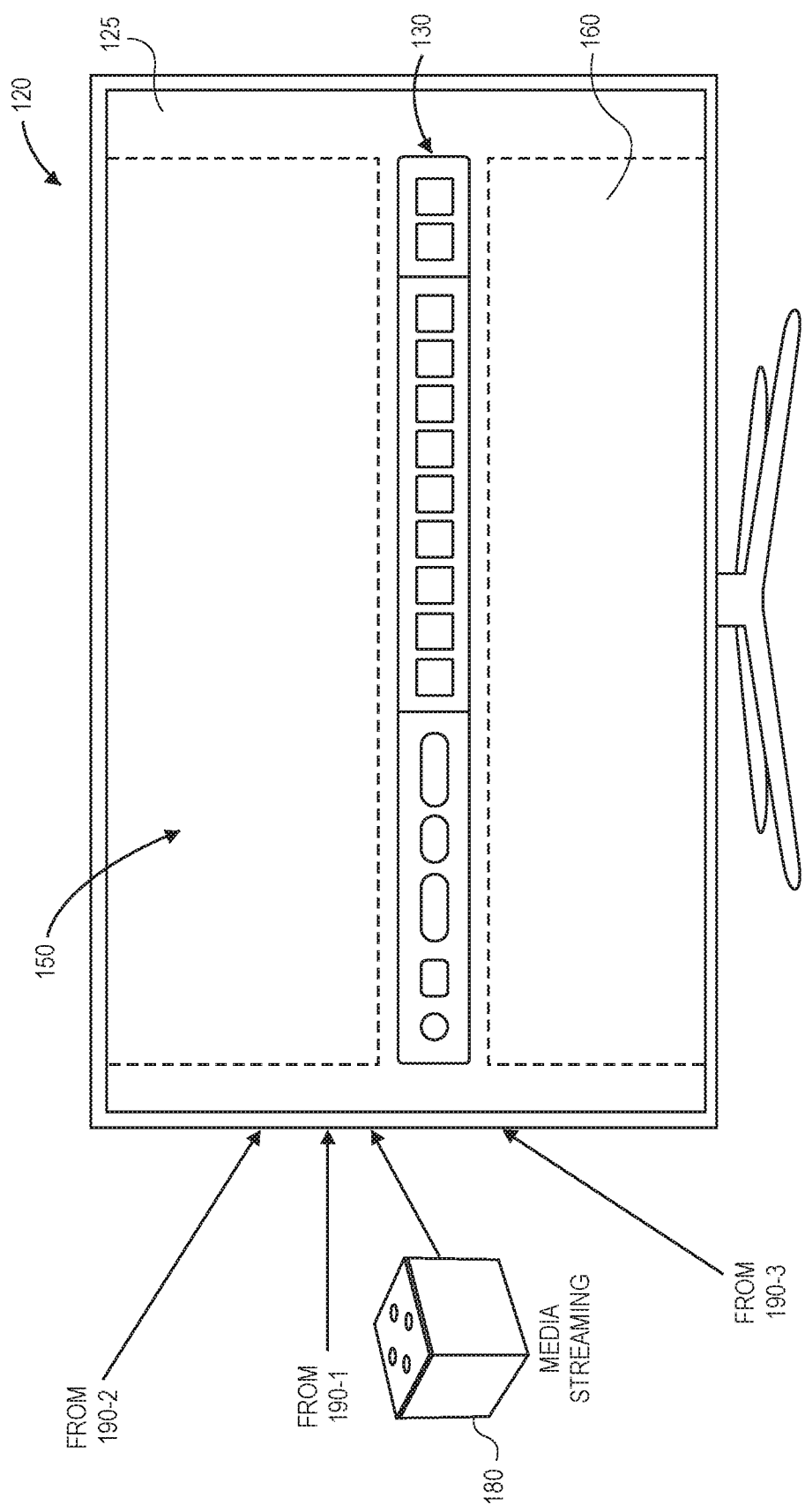

Referring to FIGS. 1A and 1B, views of aspects of one system 100 for presenting options for selecting content in accordance with implementations of the present disclosure are shown. As is shown in FIG. 1A, the system 100 includes a media distribution system 110 and a television 120, and a media streaming system 180.

The media distribution system 110, the television 120 and the media streaming system 180 may be connected to one another over a plurality of communications networks 190-1, 190-2, 190-3, including but not limited to a computer network 190-1 that may include the Internet in whole or in part, a broadcast television network 190-2 (e.g., one or more terrestrial, airborne or space-based antennas) or a cable television network 190-3, as well as any other types or forms of communications networks (e.g., a cellular telephone network). The media distribution system 110 may be any source of video files and/or associated information, data or metadata (e.g., accompanying audio signals), or a system from which streams of such video files are made available to viewers over one or more of the networks 190-1, 190-2, 190-3. For example, the media distribution system 110 may be an online marketplace, an entertainment company, a video streaming service (e.g., a free service or a pay service), a cable television provider, an operator of an over-the-air television station or channel, a social network, an outlet for news or media of any kind, or any like individual or entity.

The television 120 may be any system that is configured to display video content, and, optionally, emit one or more audio signals, including but not limited to audio signals accompanying the displayed video content. Alternatively, the television 120 may be a personal device, or one or more components of a personal device, e.g., a smartphone, a tablet computer, a laptop computer, or any other system or device having one or more processors and a display.

The media streaming system 180 may be any device that is capable of receiving content from the media distribution system 110 or other sources and providing such content to the television 120 according to a compatible protocol. For example, in some implementations, the media streaming device 180 may provide content to the television 120 via a high-definition multimedia interface ("HDMI") protocol or a Consumer Electronics Control ("CEC") protocol, or any other protocol. The media streaming device 180 may also be able to communicate with and control the television 120, e.g., to determine whether the television 120 is turned on, or set to an input source associated with the media streaming device 180, as well as to perform functions such as turning on or off, switching to a selected input source, adjusting volume of the television 120, or controlling other functions of the television 120. In some implementations, the television 120 may be a video output device that incorporates the functionality or one or more of the features of the media streaming device 180 therein (e.g., a smart television). Additionally, in some implementations, the television 120 may include one or more audio output devices, such as a speaker or a system of speakers (e.g., a base unit and a number of peripheral speakers connected to the base unit). Moreover, in some implementations, the media streaming system 180 may be a tuner, a set-top box, a cable box, or any other device for receiving content (e.g., video content and/or accompanying audio content), via not only the computer network 190-1 but also one or more of the broadcast network 190-2 or the cable network 190-3, or any other networks.

In accordance with implementations of the present disclosure, options for selecting content may be presented to users on one or more displays via a navigation bar including a number of interactive elements, such as in tiles or spaces provided above or below the navigation bar. As is shown in FIG. 1B, the television 120 includes a display 125 having a navigation bar 130, a first content section (or area or space) 150 above the navigation bar 130 and a second content section (or area or space) 160 below the navigation bar 130. The television 120 may be configured to receive content (e.g., media files of any type or form) from the networks 190-1, 190-2, 190-3 either directly or by way of the media streaming device 180. Additionally, the television 120 or, alternatively, the media streaming device 180 may be configured to render the navigation bar 130 substantially centrally on the display 125, and in a horizontal orientation, such as is shown in FIG. 1B, or in one or more other locations or orientations on the display 125. The navigation bar 130 is an interface having a plurality of elements, e.g., icons, buttons, sets of text, calls-to-action or other selectable features, depicted therein.

Moreover, the television 120 or the media streaming device 180 may be further configured to render images or video content within the first content section 150 and the second content section 160 on the display 125, or to expand or contract one or more of the first content section 150 or the second content section 160 as necessary in order to enhance the display of such images or video content. For example, in some implementations, the television 120 and/or the media streaming device 180 may render content that is being promoted to a given user, or is specifically selected for the given user, within the first content space 150. The content presented within the first content space 150 may be identified for presentation within the first content space 150 on any basis, and may, but need not, correspond to one or more elements within the navigation bar 130. In some implementations, the television 120 and/or the media streaming device 180 may further render content that is relevant to a particular context or use of the television 120 or the media streaming device 180, or that supplements content being rendered by or available to the television or the media streaming device 180, and is associated with one or more applications or content sources corresponding to an element within the navigation bar 130, within the second content section 160.

Alternatively, or additionally, the television 120, or the media streaming device 180, may cause the navigation bar 130 to ascend to a top edge of the display 125, thereby expanding an area or space within the second content section 160, and contracting an area or space within the first content section 150. Likewise, the television 120, or the media streaming device 180, may cause the navigation bar 130 to descend to a bottom edge of the display 125, thereby expanding an area or space within the first content section 150, and contracting an area or space within the second content section 160. Moreover, upon activating an application associated with a content source, such as an application for presenting content on the display 125, e.g., by selecting an element within the navigation bar 130 that corresponds to the application, the television 120 or the media streaming device 180 may cause the navigation bar 130, the first content section 150 or the second content section 160 to be removed from the display 125, and to be replaced by content associated with the application or the content source, such as a television program, a movie, a video game or other content. When the presentation of the content associated with the application or the content source is completed, the navigation bar 130 and/or one or more of the first content section 150 or the second content section 160 may be returned to the display 125.

Figure 2:
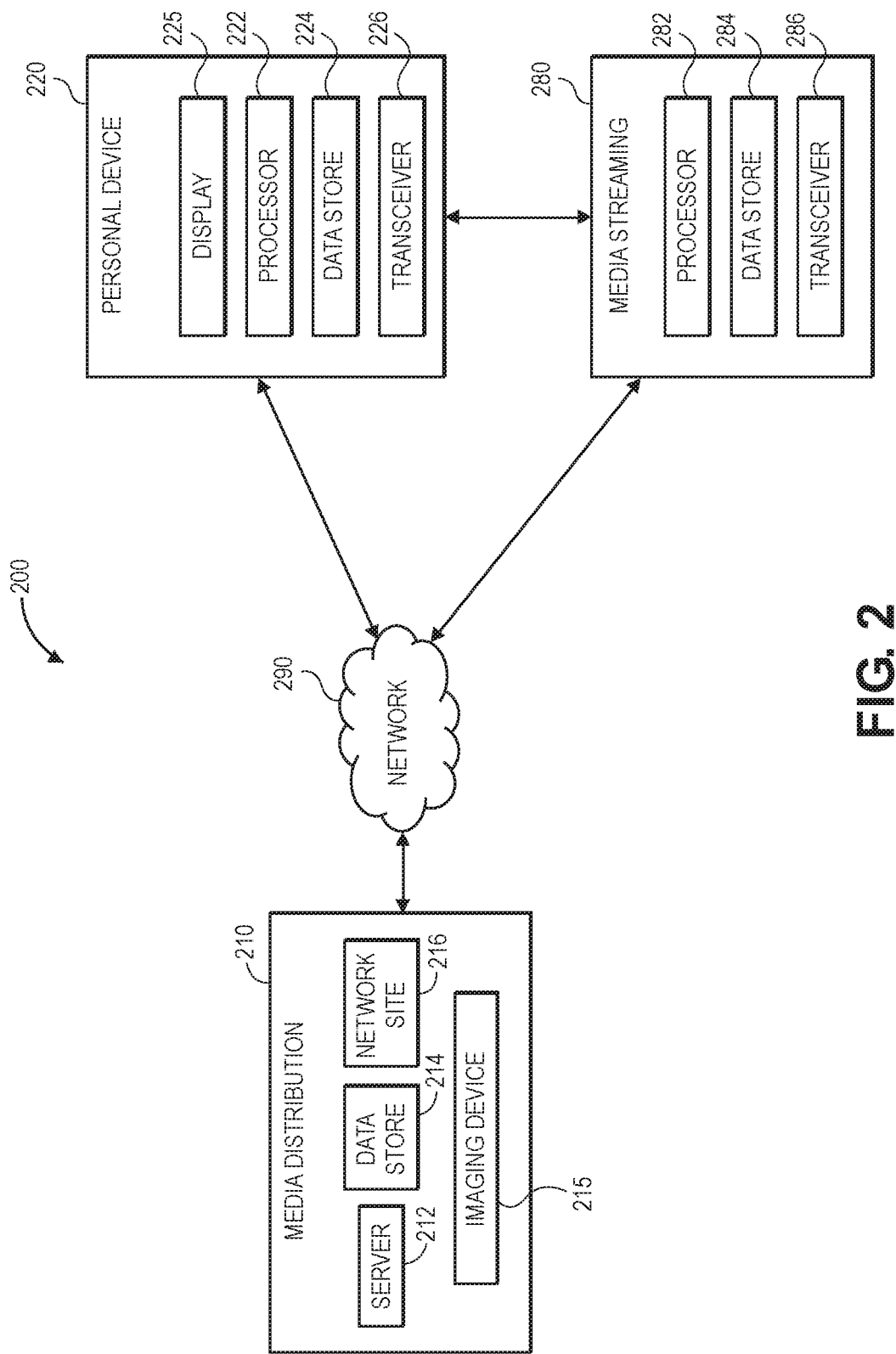
FIG. 2 is a block diagram of components of one system for presenting options for selecting content in accordance with implementations of the present disclosure.

Referring to FIG. 2, a block diagram of components of one system 200 for presenting options for selecting content in accordance with implementations of the present disclosure is shown. The system 200 shown in FIG. 2 includes a media distribution system 210, a personal device 220 and a media streaming device 280 that are connected to one another over one or more networks 290.

The media distribution system 210 may be any source or origin of digital media, e.g., still or moving images or other video content, audio content or other multimedia by way of a networked computer infrastructure, including one or more physical computer servers 212 and data stores 214 (e.g., databases) for hosting a network site 216 (or network sites). For example, the media distribution system 210 may be any individual or entity associated with the broadcasting, airing, streaming or distribution of one or more video files over the networks 290, such as an online marketplace, an entertainment company, a video streaming service, a cable television provider, an operator of an over-the-air television station or channel, a social network, an outlet for news or media of any kind, or any like individual or entity.

The media distribution system 210 may also be provided in connection with one or more physical or virtual services configured to manage or monitor such files, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data. The media distribution system 210 of FIG. 2 further includes one or more imaging devices 215 (e.g., visual imaging devices such as digital cameras), which may include any other type of imaging sensor or system for capturing imaging data that may then be processed, stored and/or distributed by the media distribution system 210, e.g., via one or more of the servers 212, the data stores 214 and/or the network sites 216, which may include one or more pages (e.g., web pages) or other features for presenting content to users.

In some implementations, the media distribution system 210 may be an Internet-based streaming content and/or media service provider. For example, the media distribution system 210 may be configured to distribute media (e.g., audio and/or video content) over the network 290 to one or more general purpose computers or computers that are dedicated to a specific purpose. The media distribution system 210 may also be configured to transmit content via a direct broadcast system, or to one or more specifically configured components such as set-top boxes or like units or components (e.g., cable boxes or converters).

For example, in some implementations, the media distribution system 210 may be associated with a television channel, network or provider of content of any type or form that is configured to transmit video files over the airwaves, via wired cable television systems, by satellite, over the Internet, or in any other manner. In some implementations, the media distribution system 210 may also be associated with any streaming video source that streams one or more video files for free or for a one-time or recurring fees. In some implementations, the media distribution system 210 may be associated with any type or form of network site (e.g., a web site), including but not limited to news sites, sports sites, cultural sites, social networks or other sites, that streams one or more video files over a network. In essence, the media distribution system 210 may be any individual or entity that makes content (e.g., audio and/or video files) of any type or form available to any other individuals or entities over one or more networks 290.

The media distribution system 210 of FIG. 2 may be independently provided for the exclusive purpose of managing the monitoring and distribution of video files or other information or data captured by the imaging device 215, such as visual imaging data and/or accompanying audio signals and metadata. Alternatively, the media distribution system 210 may be operated in connection with one or more physical or virtual services configured to manage the monitoring or distribution of such files, as well as one or more other functions. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the media distribution system 210, including but not limited to the marketing of one or more video files, receiving and granting authentication requests (e.g., log-in names and/or passwords), or any other purpose. The servers 212 and/or the computer processors may also connect to or otherwise communicate with the networks 290, through the sending and receiving of digital data.

The imaging device 215 may comprise any form of optical recording sensor or device that may be used to photograph or otherwise record information or data regarding activities occurring within one or more areas or regions of a given environment, e.g., a scene or a setting, or for any other purpose. The media distribution system 210 may include one or more of the imaging devices 215, each of which may include any number of sensors, memory or storage components (e.g., a database or another data store), processors and any other components that may be required in order to capture, analyze and/or store imaging data or accompanying audio signals captured from within static or variable environments in which the imaging device 215 is provided. For example, one or more of the imaging devices 215 may capture one or more still or moving images, along with any relevant audio signals or other information, and may also connect to or otherwise communicate with one another, or with the networks 290.

In addition to the imaging device 215, the media distribution system 210 may include any type or form of systems or components for receiving video files and associated audio signals or metadata, e.g., over the networks 290. For example, the media distribution system 210 may receive one or more video files via any wired or wireless means and store such video files in the one or more data stores 214 for subsequent processing, analysis and distribution. In some implementations, the media distribution system 210 may process and/or analyze video files captured by the imaging device 215 or received over the networks 290 from one or more external sources according to one or more detection or recognition algorithms or techniques, in order to detect or recognize one or more attributes of the visual content expressed therein, or of the audio signals accompanying such visual content. In some implementations, the media distribution system 210 may be further configured to add or assign metadata, e.g., one or more tags or virtual markings, to video files. Such metadata may indicate times or points within a video file where one or more specific products or categories of products is depicted or referenced therein, or include one or more identifiers of such products or categories. The media distribution system 210 may generate any type or form of record associated with the visual content of a video file, or the audio signals accompanying the video file, and may store such records in association with a corresponding video file or separately, e.g., in a structured form. Such records may be made available to other entities, such as the personal device 220 and/or the media streaming device 280 e.g., over the networks 290.

Additionally, the media distribution system 210 may be further configured to edit, crop, alter, modify or adjust one or more attributes of a video file. For example, where a video file is captured by the imaging device 215 or received from one or more external sources, e.g., over the networks 290, one or more single images, or streams of images, may be captured or otherwise obtained from the video file, and transmitted to the personal device 220 and/or the media streaming device 280. The media distribution system 210 may also be configured to compare and contrast visual content and/or audio signals or metadata regarding two or more video files, and to make any number of determinations regarding the similarity or differences between such video files, audio signals or metadata. For example, the media distribution system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The media distribution system 210 may also be configured to calculate one or more scores indicative of similarities or differences between such frames or such files. The media distribution system 210 may also be configured to engage in communications of any type or form with the personal device 220 and/or the media streaming device 280.

The media distribution system 210 may further broadcast, air, stream or otherwise distribute video files maintained in the data stores 214 to one or more users, via the personal devices 220 and/or the media streaming devices 280, over the networks 290. Accordingly, in addition to the server 212, the data stores 214, the imaging device 215 and the network sites 216, the media distribution system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

For example, in some implementations, the media distribution system 210 may also receive or access one or more records of information, data or metadata regarding preferences of a given user, or of users similarly situated to the user or otherwise having one or more attributes in common with the user, as well as any information, data or metadata regarding one or more contexts or events, instances or occurrences of particular relevance in association with a specific time or location. Based on such information, data or metadata, the media distribution system 210 may identify media content (e.g., audio and/or video content) to be presented to a user in association with one or more applications or content sources, including but not limited to media content to be promoted to the user, or contextual or supplemental content to be displayed to the user in association with the applications or content sources. The media distribution system 210 may further generate media files including such content, or modify one or more existing media files to include such content, and transfer such video files to the personal device 220 or the media streaming device 280 over the networks 290 or by any other means. Additionally, the media distribution system 210 may further engage in communications of any type or form with the personal devices 220 and/or the media streaming devices 280.

The personal device 220 may be any peripheral output device capable of receiving and displaying or otherwise outputting any content. The personal device 220 may be associated with any user (e.g., an individual or entity), and may be a general purpose or a special purpose device for viewing content and/or communicating with other computer devices over the networks 290. For example, the personal device 220 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, or communicate with the media streaming device 280, and may be configured to render content on one or more displays or to interact with such content.

The personal device 220 may include a display (or screen) 225, a processor 222, a data store 224 and/or a transceiver 226. The display 225 may be a television system, a monitor or any other like machine having a screen for viewing rendered video content. For example, the display 225 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 225 may be configured to receive content from any number of sources via one or more wired or wireless connections, including but not limited to the media distribution system 210 or the media streaming devices 280 over the networks 290.

The processor 222 may be configured to perform any type or form of computing function associated with the operation of the personal device 220, including but not limited to the execution of one or more machine learning tools, algorithms or techniques. The processor 222 may also be configured to execute any other algorithms or techniques (e.g., object detection or recognition algorithms or techniques) associated with one or more applications, purposes or functions, and may communicate with the media distribution system 210, the media streaming system 280, or any other external computing devices or machines over the network, through the sending and receiving of digital data.

The processor 222 may be a uniprocessor system including one processor, or a multiprocessor system including several processors (e.g., two, four, eight, or another suitable number), and may be capable of executing instructions. For example, in some implementations, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs. The processors 222 may be configured to operate one or more software applications, e.g., a browser, a viewing application operating one or more codecs, a shopping application, and render content to the display 225 via one or more user interfaces. The processor 222 may execute one or more computer-based instructions that may be stored on the data store 224, along with one or more video files or operating programs or instructions.

The personal device 220 further includes one or more data stores (e.g., memory or storage components) 224 for storing any type of information or data, e.g., content received over the network 290, or any associated information, data or metadata. The personal device 220 also includes the transceiver 226, which may be configured to enable the personal device 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceivers 226 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceiver 226 may further include or be in communication with one or more input/output (or "I/O") interfaces, network interfaces and/or input/output devices, and may be configured to allow information or data to be exchanged between one or more of the components of the personal device 220, or to one or more other computer devices or systems (e.g., other aerial vehicles, not shown) via the network 290. For example, in some implementations, the transceiver 226 may be configured to coordinate I/O traffic between the processor 222 and one or more external computer devices or components, and may perform any necessary protocol, timing or other data transformations in order to convert data signals from a first format suitable for use by one component into a second format suitable for use by another component. In some implementations, the transceiver 226 may include support for devices attached through various types of peripheral buses, e.g., variants of the Peripheral Component Interconnect (PCI) bus standard or the Universal Serial Bus (USB) standard. In some other implementations, functions of the transceiver 226 may be split into two or more separate components, or integrated with the processor 222.

The media streaming device 280 may also be any type of device or devices capable of outputting visual and/or audible content, e.g., from the media distribution system 210 or any other sources of such content, and providing such content to the personal device 220 according to any protocols and by any wired or wireless techniques, e.g., a high-definition multimedia interface (HDMI) protocol, such as a Consumer Electronics Control (CEC) protocol. The media streaming device 280 includes a processor 282, a data store 284 and a transceiver 286, which may share one or more attributes, features or functions in common with the processor 222, the data store 224 or the transceiver 226, respectively, or may have one or more attributes, features or functions that are different from those of the processor 222, the data store 224 or the transceiver 226. In some implementations, the media streaming device 280 may also be capable of communicating with and controlling the personal device 220, e.g., to turn the personal device 220 on or off, to select an input source for the personal device 220, to adjust a volume of the personal device 220, or to otherwise control any other functions of the personal device 220.

Those of ordinary skill in the pertinent arts will recognize that the personal device 220 or the media streaming device 280 may include any number of hardware components or operate any number of software applications for receiving and rendering content received from the media distribution system 210 or other sources.

Moreover, those of ordinary skill in the pertinent arts will further recognize that, alternatively, in some implementations, the personal device 220 or the media streaming device 280 need not be associated with a given user. For example, the personal device 220 or the media streaming device 280 may be provided in a public place, beyond the control of any one user, e.g., a television provided in a bar, restaurant, transit station, or shopping center, or an electronic billboard provided in a population center or along a transit line, where any individuals may view and/or interact with video content rendered on the display 225.

Although the system 200 shown in FIG. 2 shows boxes for one media distribution system 210, one personal device 220, one media streaming device 280 and one network 290, those of ordinary skill in the pertinent arts will recognize that any number of media distribution systems 210, personal devices 220, media streaming devices 280 or networks 290 may be considered in accordance with the present disclosure. For example, multiple users may access, view and interact with content provided by multiple media distribution systems 210 (e.g., television channels or networks, marketplaces, social networks and any other content providers or sites), via multiple personal devices 220, and such content may include multiple types or forms of media provided by multiple content sources. Moreover, the personal devices 220 or the media streaming devices 280 with which users interact to access, view and interact with content may include all or fewer of the components shown in FIG. 2 or perform all or fewer of the functions described herein. For example, a user may view content on one personal device 220, and execute interactions relating to that content on another personal device 220, such as a remote control, a smartphone, a smart speaker, a smart wristwatch, or the like.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the media distribution system 210 to the personal device 220 or the media streaming device 280 over multiple networks. For example, a video file may be broadcast over the air or via satellite to a cable television provider, before being transmitted by the satellite or the provider to a receiver associated with the personal device 220, and shown on the display 225 and/or recorded in the data store 224. Alternatively, video files may be transmitted over a traditional computer network, such as the Internet, prior to reaching the personal device 220. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The server 212 and the personal device 220, and associated components, may use any web-enabled or Internet applications or features, or any other client-server applications or features, to connect to the networks 290, or to communicate with one another, such as through short or multimedia messaging service (SMS or MMS) text messages. For example, the server 212, the personal device 220 and the media streaming device 280 may be configured to transmit information or data in the form of synchronous or asynchronous messages to one another in real time or in near-real time, or in one or more offline processes, via the networks 290. Those of ordinary skill in the pertinent art would recognize that the server 212, the personal device 220 and the media streaming device 280 may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the processor 222, or the processor 282, or to any other computers or control systems utilized by the media distribution system 210, the personal device 220, or the media streaming device 280, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "image," "video," "video program," or like terms, may refer to files comprising one or more images or video frames that are configured for broadcasting, airing, streaming or distributing in any manner, such as over any number of networks, or in a hard storage format (e.g., a DVD, a stick drive or another physically portable format). As used herein, the terms "sounds," "audio," "audio program," or like terms, may refer to files comprising one or more sounds or other acoustic signals that are also configured for broadcasting, airing, streaming or distributing in any manner, such as over any number of networks, or in a hard storage format. As used herein, the terms "program," "content" or "media" may refer to audio and/or video files that may be presented by one or more of a personal device directly, or by a personal device via a media streaming device, and may include but are not limited to information, data or metadata including or relating to such audio and/or video files.

Figure 3A:
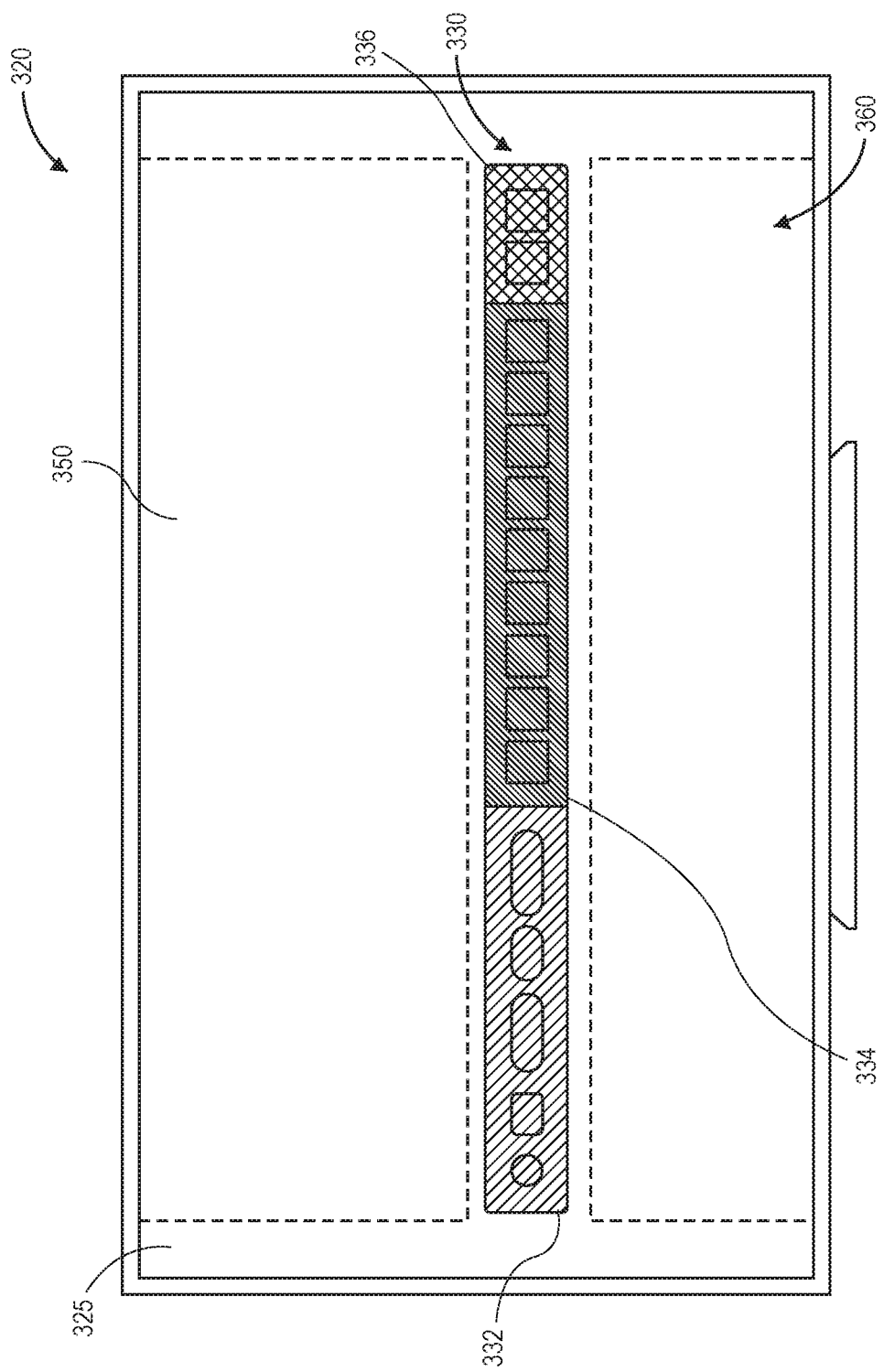
FIGS. 3A and 3B are views of aspects of one system for presenting options for selecting content in accordance with implementations of the present disclosure.
Figure 3B:
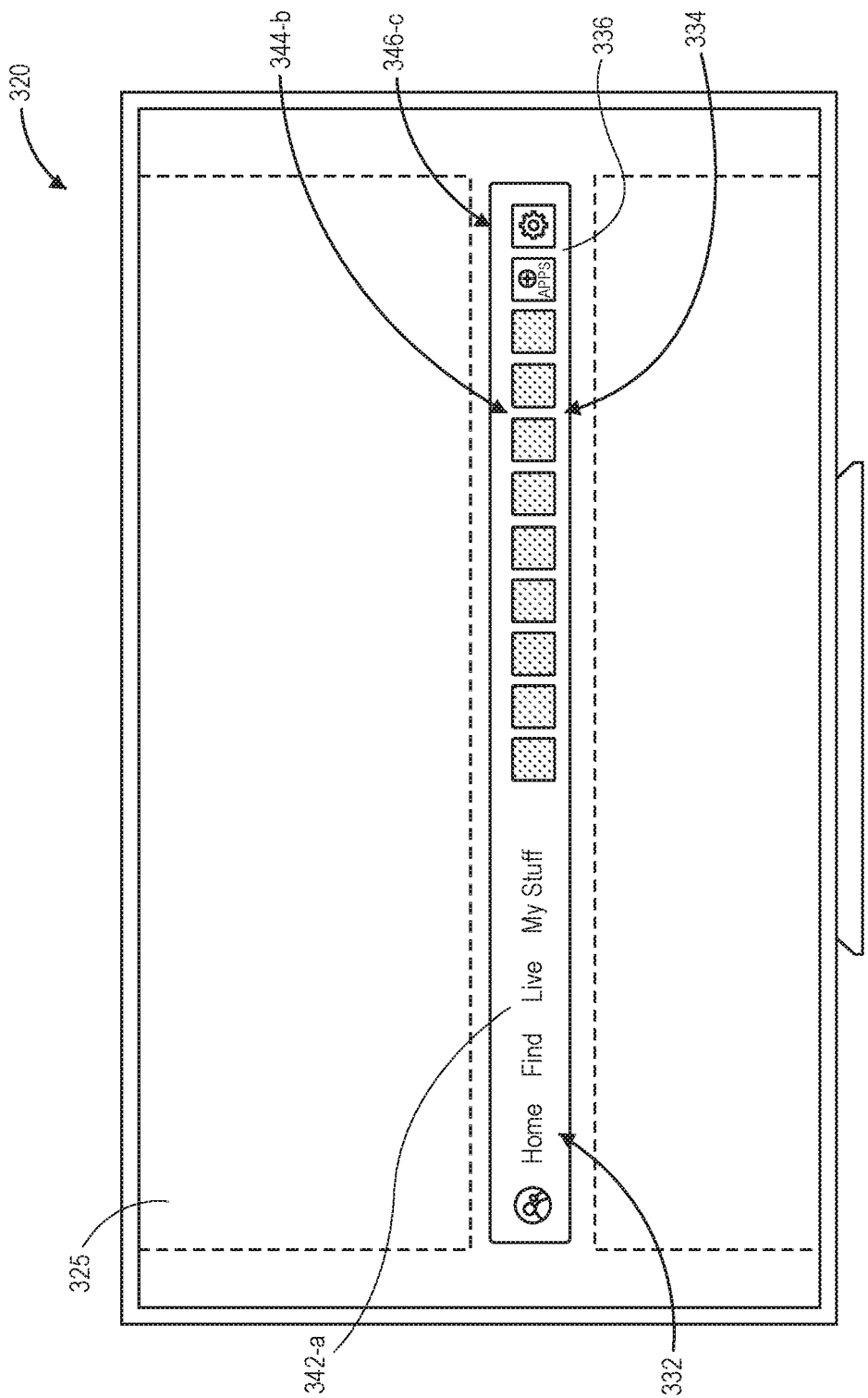

In accordance with implementations of the present disclosure, a navigation bar may include a plurality of elements arranged by their respective types in designated locations. Each of the elements may be associated with a browse destination (e.g., a system-defined way to browse or search for content, to select or change a profile of a user, or to reach a home screen), content sources (e.g., system-defined or customer-defined applications, inputs, services or other content sources) or utility applications (e.g., system-defined applications for purchasing one or more other applications or access to one or more content sources, or for changing one or more settings), or other applications or features. Referring to FIGS. 3A and 3B, views of aspects of one system for presenting options for selecting content in accordance with implementations of the present disclosure are shown.

As is shown in FIG. 3A, a personal device (e.g., a monitor or television) 320 includes a display 325 having a navigation bar 330, a first content section (or area or space) 350 above the navigation bar 330 and a second content section (or area or space) 360 below the navigation bar 330. The personal device 320 may be configured to receive content (e.g., media files of any type or form) from one or more networks, either directly or by way of a media streaming device (not shown). The navigation bar 330 may be rendered on the display 325 by one or more applications executed by one or more processors operating on the personal device 320, or on a media streaming device (not shown) in communication with the personal device 320. As is shown in FIG. 3A, the navigation bar 330 is displayed substantially centrally across the display 325, and in a horizontal orientation. Alternatively, the navigation bar 330 may be rendered in any location on the display 325, and in any orientation. Additionally, as is also shown in FIG. 3A, the navigation bar 330 has a substantially rectangular shape, with solid borders on each of a plurality of sides. Alternatively, the navigation bar 330 may have any shape, and may include borders on fewer than all sides, or need not include any borders. Moreover, the navigation bar 330 need not take a shape or a form of a "bar." Instead, in some implementations, the navigation bar 330 may be a navigation system having any other shape or form, and may have any number of straight, rounded or curvilinear sides or edges.

As is further shown in FIG. 3A, the navigation bar 330 comprises a plurality of element zones (or sections) 332, 334, 336, within which elements of a common type or category may be displayed. The element zones 332, 334, 336 may each occupy a selected proportion or length of the navigation bar 330, and be provided in any location within the navigation bar 330.

As is shown in FIG. 3B, a first element zone 332 aligned near a left end of the navigation bar 330 includes elements 342-a (e.g., icons, buttons, sets of text, calls-to-action or other selectable features) corresponding to browse destinations, e.g., menus or selectors for accessing or designating a user profile, for returning the display 325 to a "home" screen or default configuration, for initiating a search for applications or content, for identifying "live" content being generated and made available in real time or near-real time, or for accessing content owned or controlled by a user. A second element zone 334 aligned between the first element zone 332 and a third element zone 336 includes elements 344-b corresponding to content sources for presenting content on the display 325, e.g., content sources such as applications, inputs, services or others. The third element zone 336 aligned near a right end of the navigation bar 330 includes elements 346-c corresponding to utility applications, such as an application for accessing an electronic marketplace ("application store") or other application or source for purchasing, downloading or otherwise acquiring other applications or access to other content sources.

Although the navigation bar 330 includes three element zones 332, 334, 336, navigation bars may include any number of element zones, e.g., as few as one or more of such sections, which may be selected to accommodate elements corresponding to applications of any type or form. Alternatively, in some implementations, the navigation bar 330 need not include any designated element zones, and may instead include various types or forms distributed along a length of the navigation bar 330. For example, in some implementations, the navigation bar 330 may include the element zone 332 and the elements 342-a therein, and the element zone 334 and the elements 344-b therein, but need not include the element zone 336 or the elements 346-b therein.

Figures 4A, 4B, 4C:
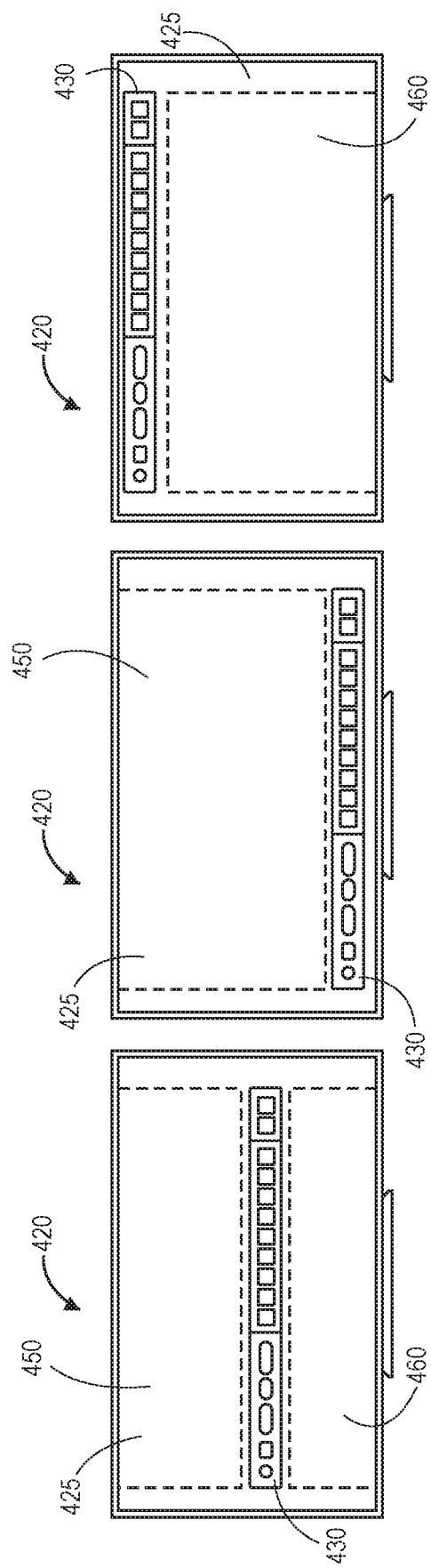
FIGS. 4A through 4C are views of aspects of one system for presenting options for selecting content in accordance with implementations of the present disclosure.

As is discussed above, navigation bars of the present disclosure may be provided in any location and orientation on a display of a television, a monitor or another personal device, and content of any type or form may be displayed above or below the navigation bar. In some implementations, the placement, format and arrangement of content may be selected or determined based on a position of a cursor (or another selection element) on the navigation bar. Referring to FIGS. 4A through 4C, views of aspects of one system for presenting options for selecting content in accordance with implementations of the present disclosure are shown.

As is shown in FIG. 4A, a navigation bar 430 is located on a display 425 of a personal device 420 (e.g., a television or monitor), and is aligned substantially horizontally, between a first content space (e.g. an upper content space) 450 above the navigation bar 430 and a second content space (e.g. a lower content space) 460 below the navigation bar 430. In some implementations, the location and orientation of the navigation bar 430 on the display 425 shown in FIG. 4A may be a default location and orientation, or a default configuration, that is rendered after turning on the personal device 420 or a media streaming device in communication with the personal device 420, or when a cursor is placed on one of the elements within the navigation bar 430. Alternatively, the navigation bar 430 may be rendered on the display 425 in the location and orientation shown in FIG. 4A at any time or for any reason. For example, in some implementations, the navigation bar 430 may include a browse destination (e.g., "home") that, when a cursor is placed on the browse destination, or when the browse destination is activated, such as by a selection, causes the display 425 to appear as or return to the configuration shown in FIG. 4A.

As is shown in FIG. 4B, the navigation bar 430 is shown at a lower edge (or bottom edge) of the display 425, and the first content space 450 is expanded to occupy a balance of the display 425 above the navigation bar 430. In some implementations, the navigation bar 430 may descend to the lower edge of the display 425 when a cursor is moved from one of the elements within the navigation bar 430 upward into the first content space 450, or upon any other events. In some other implementations, the navigation bar 430 may disappear or be removed from the display 425 upon an activation of one or more icons, buttons or other interactive features corresponding to an application, a content source, television program, a movie, a video file, or any other content that may be presented on the display 425.

As is shown in FIG. 4C, the navigation bar is shown at an upper edge (or top edge) of the display 425, and the second content space 460 is expanded to occupy a balance of the display below the navigation bar 430. In some implementations, the navigation bar 430 may ascend to the upper edge of the display 425 when a cursor is moved from one of the elements within the navigation bar 430 downward into the second content space 460, or upon any other events. In some other implementations, the navigation bar 430 may disappear or be removed from the display 425 upon further navigation (e.g., downward movement of the cursor) within the second content space 460, or upon causing content to be presented on the display 425.

Figure 5:
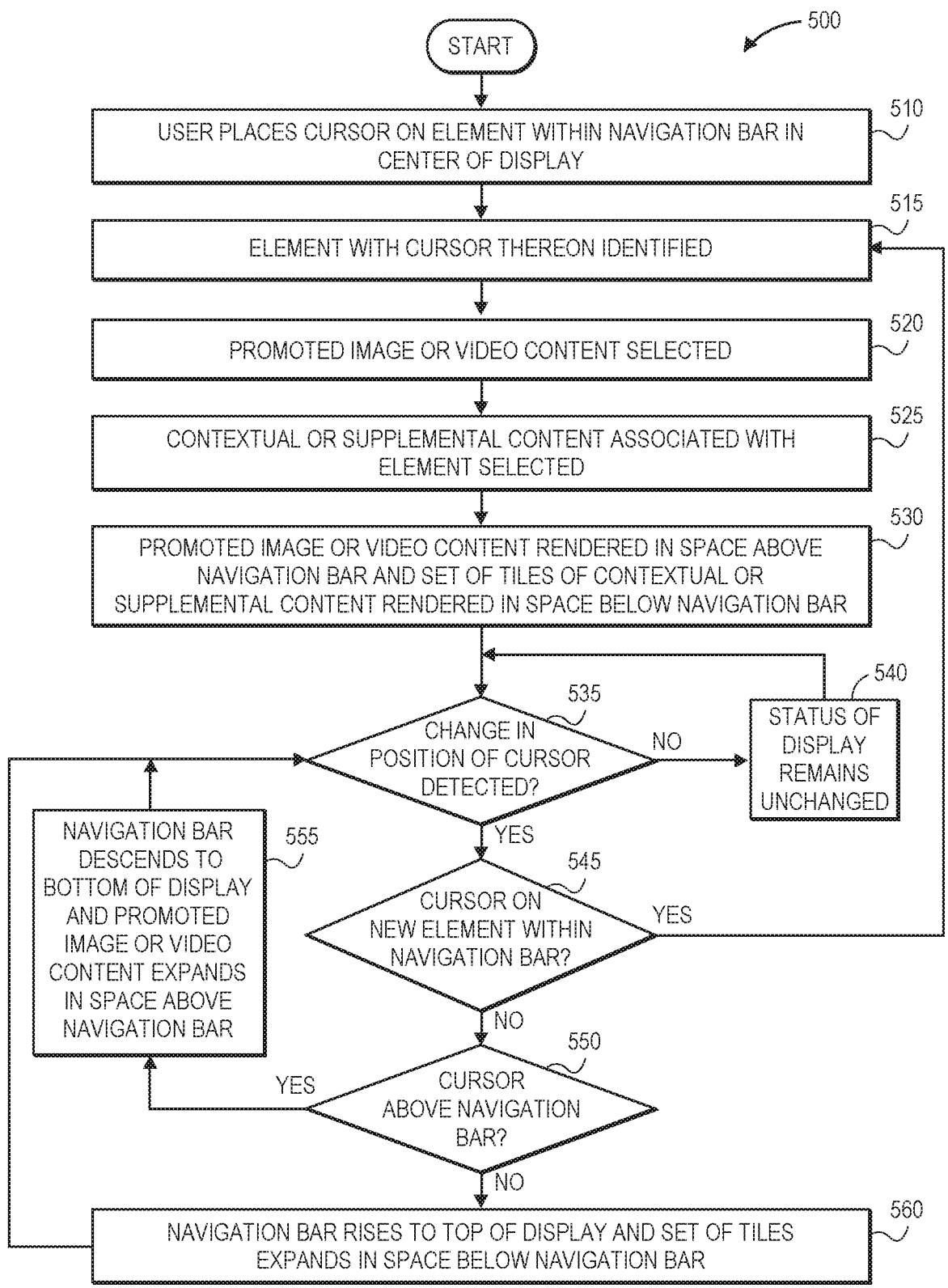
FIG. 5 is a flow chart of one process for presenting options for selecting content in accordance with implementations of the present disclosure.

Referring to FIG. 5, a flow chart 500 of one process for presenting options for selecting content in accordance with implementations of the present disclosure is shown. At box 510, a user places a cursor (or another selection element) on an element within a navigation bar provided in a center of a display, or in any other location on the display. For example, referring again to FIG. 3B, the navigation bar may include icons, buttons, sets of text, calls-to-action or other selectable features corresponding to one or more browse destinations, e.g., menus or selectors for accessing or designating a user profile, for returning a display to a "home" screen or default configuration, for initiating a search function, for identifying "live" content being generated and made available in real time or near-real time, or for accessing content owned or controlled by a user. The navigation bar may further include icons, buttons, sets of text, calls-to-action or other features (e.g., "content elements") for selecting or activating one or more content sources such as applications, inputs, services or others, or for activating one or more utility applications. The icons, buttons, sets of text, calls-to-action or other selectable features may be provided in any order or arrangement within the navigation bar that is defined on any basis, e.g., at random, in a customized manner designated by a user, or to accommodate one or more promotions, or on any other basis. The user may place the cursor on the element in any manner, such as by manipulating a remote control, a personal device (e.g., a mobile device such as a smartphone, a smart watch or a tablet computer), a desktop or laptop computer, a voice-activated computer (e.g., a smart speaker) in communication with a television or other display system, or a media streaming device in communication with the television or other display system. Alternatively, the user may place the cursor on the element by activating one or more features of the display (e.g., knobs, switches or buttons), or by contacting the element on the display (e.g., where the display is a touchscreen).

When a cursor or another selection element is placed on a given element, the cursor or selection element may be shown as a box, outline or other shape on, over or around the given element, in order to visually identify the given element to the user. In some implementations, the element itself may be modified to indicate the location of the cursor or selection element thereon, either directly or relative to the other elements. For example, when a cursor or another selection element is placed on a given element, the given element may be changed in color or in illumination (e.g., darkened or lightened), or displayed with any other visual effects, with respect to other elements. Alternatively, or additionally, aspects of the other elements may be changed in color or in illumination, or displayed with any other visual effects, to indicate the location of the cursor or selection element on the given element. As yet another example, when a cursor or another selected element is placed on a given element, the given element may be changed in size or shape with respect to other elements. For example, the given element may be show as larger or smaller than other elements, or in a different shape than the other elements, to indicate the location of the cursor or selection element on the given element. Any number, type or form of changes or effects may be applied to an element having a cursor or other selection element thereon, or to other elements, alone or in combination with one another, in order to visually distinguish that element from the other elements in accordance with implementations of the present disclosure.

At box 515, the element with the cursor thereon is identified. For example, where the elements (e.g., selectable features corresponding to browse destinations, content sources, utility applications, or others) are arranged within the navigation bar in known locations, a position of the cursor on the display may be used to identify an element at that position.

At box 520, a promoted image or video content is selected. For example, in some implementations, the contextual or supplemental content may be specifically selected for a user, based on one or more attributes of the user, or one or more known or predicted preferences of the user, which may be determined on any basis, such as a viewing or purchasing history of the user. In some other implementations, the promoted image or video comment may be particularly relevant to a time, a day or date, a week, a month, a year, or any other temporal basis, e.g., a forthcoming or recently occurring holiday, or events that are currently or historically associated with the time, the day or date, the week, the month, the year, or any other temporal basis. For example, the promoted image or video content may be selected on a seasonal basis (e.g., holiday movies or programs in the months of November or December), on a localized basis (e.g., basketball in Connecticut in March each year), on predicted or actual weather conditions (e.g., content relating to warm or cold weather during hot spells or snowstorms, respectively). Furthermore, in some implementations, the promoted image or video content may include content captured by one or more home security systems, either in real time or in near-real time, at a location associated with the display or a personal device, or at any other location with which the user is associated. The promoted image or video content may be or include advertisements of any kind, announcements (e.g., public service announcements), news, sports, weather, or any other information.

Alternatively, in some implementations, the promoted image or video content may relate to the element identified at box 515. For example, where the element is a selectable feature corresponding to a content application (e.g., an application associated with a media service for airing movies, television shows, sporting events, news, or other content, as well as a gaming application, a photo service, a media store, a music application, or others), a single image, or a set of images, associated with the content application or the media service may be identified. For example, video stream including a first plurality of video frames is identified. In some implementations, the image or images may include a video stream that is aired live, or subject to a broadcast delay, or was otherwise previously recorded. In some implementations, the image or images may be stored in one or more data stores, or maintained in any other format.

In such implementations, the promoted image or video content may relate to the application or the media service itself, and may identify one or more offers, events, promotions or other information regarding such content. Alternatively, the image or images may include aspects of one or more programs, e.g., still or moving images of a movie, a television show, a past or ongoing sporting event, a concert, or others. Where the element is a selectable feature corresponding to a browse destination, such as a "home" page or default configuration, a system-defined feature for selecting a profile, or one or more designated options for browsing, searching or otherwise identifying content, a single image, or a set of images, associated with the browse destination (e.g., a predetermined image associated with the "home page"; a profile name, image or icon; or one or more images or accompanying text associated with a designated option may be identified. Where the element is a selectable feature corresponding to a utility application, such as an electronic marketplace ("application store") or other application or source for purchasing, downloading or otherwise acquiring other applications, a single image, or a set of images, associated with the utility application or any functions performed thereby may be identified. The promoted image or video content may further include any number of audio content or other information, data or metadata accompanying the image or images, as appropriate.

At box 525, contextual or supplemental content associated with the element is selected. For example, the contextual or supplemental content may relate directly to the element, or contexts or attributes within which an application corresponding to the element may be utilized. The contextual or supplemental content may relate to specific aspects of the content that may be categorized, sorted, or divided into parts, on any basis. For example, where the element is a selected feature corresponding to an application associated with a media service, the contextual or supplemental content may identify one or more specific programs or media offered by the media service, including specific movies, television shows, sporting events, news, video games, photographs, songs, or other programs or media. Where the element is a browse destination, the contextual or supplemental content may relate to one or more features or attributes of the browse destination, including but not limited to menu options, applications, functions, options or other features or attributes. Where the element is a utility application, the contextual or supplemental content may relate to one or more features or attributes of the utility application, including but not limited to one or more settings or statuses of the television or the media streaming device. The contextual or supplemental content may be any type or form of visual content (e.g., one or more images), and may include any accompanying audio content or other information, data or metadata.

At box 530, the promoted image or video content is rendered in a space above the navigation bar, and a set of tiles (or images, thumbnails, windows or other visual features) including some or all of the contextual or supplemental content is rendered in a space below the navigation bar. For example, referring again to FIG. 3B, the promoted image or video content may be displayed in the first content section 350, along with any titles, descriptions, ratings, or summaries of the promoted image or video content (or associated images or video content), as well as one or more icons, buttons, other sets of text, calls-to-action, or any selectable features), while one or more discrete tiles of the contextual or supplemental content may be displayed in the second content section 360, along with any labels, categories, descriptors or other information, data or metadata regarding such tiles or the content depicted therein.

At box 535, whether a change in a position of the cursor is detected is determined. For example, a change in the position of the cursor may be determined by identifying coordinates or other identifiers of the position of the cursor at box 535, and comparing such coordinates or other identifiers to the coordinates or identifiers by which the element with the cursor thereon was identified at box 515. Alternatively, or additionally, a change in the position of the cursor may be detected in any other manner, such as based on one or more control signals for manipulating the cursor that may be detected by or entered into a remote control, a personal device, a computer, a voice-activated device, a media streaming device, or one or more features of the display (e.g., knobs, switches, buttons or locations on a touchscreen).

If a change in the position of the cursor is not detected, then the process advances to box 540, where the status of the display remains unchanged, e.g., with the promoted image or video content and the contextual or supplemental content rendered above or below the navigation bar, respectively. Alternatively, the process may return to box 520, where additional or other promoted images or video content are identified, or to box 525, where additional or other contextual or supplemental content is identified, such as where a predetermined period of time has lapsed since the user changed the position of the cursor, or where one or more conditions or bases by which the promoted image or video content and the contextual or supplemental content were selected at box 520 and box 525, respectively, have changed.

If a change in the position of the cursor is detected, however, then the process advances to box 545, where whether the cursor is located on a new element within the navigation bar is determined. If the cursor is located on the new element, then the process returns to box 515, where the new element is identified, and to boxes 520 and 525, where new promoted image or video content is selected, and contextual or supplemental content associated with the new element is selected for the new element. Alternatively, in some implementations, the promoted image or video content may remain unchanged in the space above the navigation bar after returning to box 515, e.g., box 520 may be omitted, and contextual or supplemental content associated with the new element may be selected.

If the cursor is not located on a new element, however, then the process advances to box 550, where whether the cursor is located above the navigation bar following the change in position is determined. If the cursor is located above the navigation bar, then the process advances to box 555, where the navigation bar descends to the bottom of the display, and the promoted image or video content expands in the space above the navigation bar. For example, in some implementations, the promoted image or video content may be stretched, expanded or revealed and rendered in an expanded upper section above the navigation bar, or replaced with another promoted image or video content associated with the element, along with any additional information or data (e.g., titles, descriptions, ratings, or summaries of the promoted image or video content, or one or more icons, buttons, other sets of text, calls-to-action, or any selectable features). The descent of the navigation bar and the expansion of the promoted image or video content causes the contextual or supplemental content to disappear from the display.

In some implementations, after the navigation bar has descended to the bottom of the display, the user may activate an application or begin playing content by selecting a call-to-action or another selectable feature. Activating an application or playing content may cause the promoted image or video content and any additional information to disappear from the display, along with the navigation bar. Alternatively, in some implementations, stopping the application or pausing the content may cause one or more of the promoted image or video content to return to the display.

If the cursor is not located on a new element within the navigation bar, and if the cursor is not located above the navigation bar, then the cursor is located below the navigation bar, and the process advances to box 560, where the navigation bar ascends to a top of the display, and the set of tiles expands in the space below the navigation bar. For example, where a set of tiles including contextual or supplemental content is rendered in the space below the navigation bar, raising the navigation bar to the top of the display enables one or more of the tiles to grow in size within the space below the navigation bar, or additional tiles of contextual or supplemental content to be added to the space below the navigation bar. Where the cursor is located on one of the tiles of contextual or supplemental content, additional tiles of contextual or supplemental content may be selected on any basis, including but not limited to one or more attributes of the element on which the cursor was originally located at box 510, or the tile of contextual or supplemental content on which the cursor is located, or on any other basis.

In some implementations, after the navigation bar has ascended to the top of the display, the user may activate a specific aspect of an application (e.g., a media streaming application) associated with a given tile of contextual or supplemental content. For example, where the cursor was previously located on an icon or other selectable feature within the navigation bar corresponding to an application for streaming media, and the contextual or supplemental content includes tiles having portions of specific programs (e.g., movies, television shows, sporting events, news, video games, photographs, songs, or others), the user may activate the specific program associated with the tile by clicking or making one or more other directed interactions with that tile. Additionally, in some implementations, where the user continues to move throughout tiles of contextual or supplemental content below the navigation bar, the navigation bar may disappear from the display, until the cursor returns to one of the tiles of the contextual or supplemental content that was originally displayed with the navigation bar.

After the navigation bar has ascended to the top of the display, and the set of tiles has expanded below the navigation bar, the process returns to box 535, where whether a change in a position of the cursor is detected may be determined.

One or more elements of the process shown in the flow chart 500 of FIG. 5 may be repeated, as necessary, until the occurrence of one or more events. For example, one of the elements corresponding to applications within the navigation bar may be activated, e.g., by an interaction such as a click-based selection with one or more selectable features within the promoted image or video content, or with one or more of the set of tiles of the contextual or supplemental content, or upon the occurrence of any events, e.g., turning off a television system or media streaming system, or any other events.

Figure 6A:
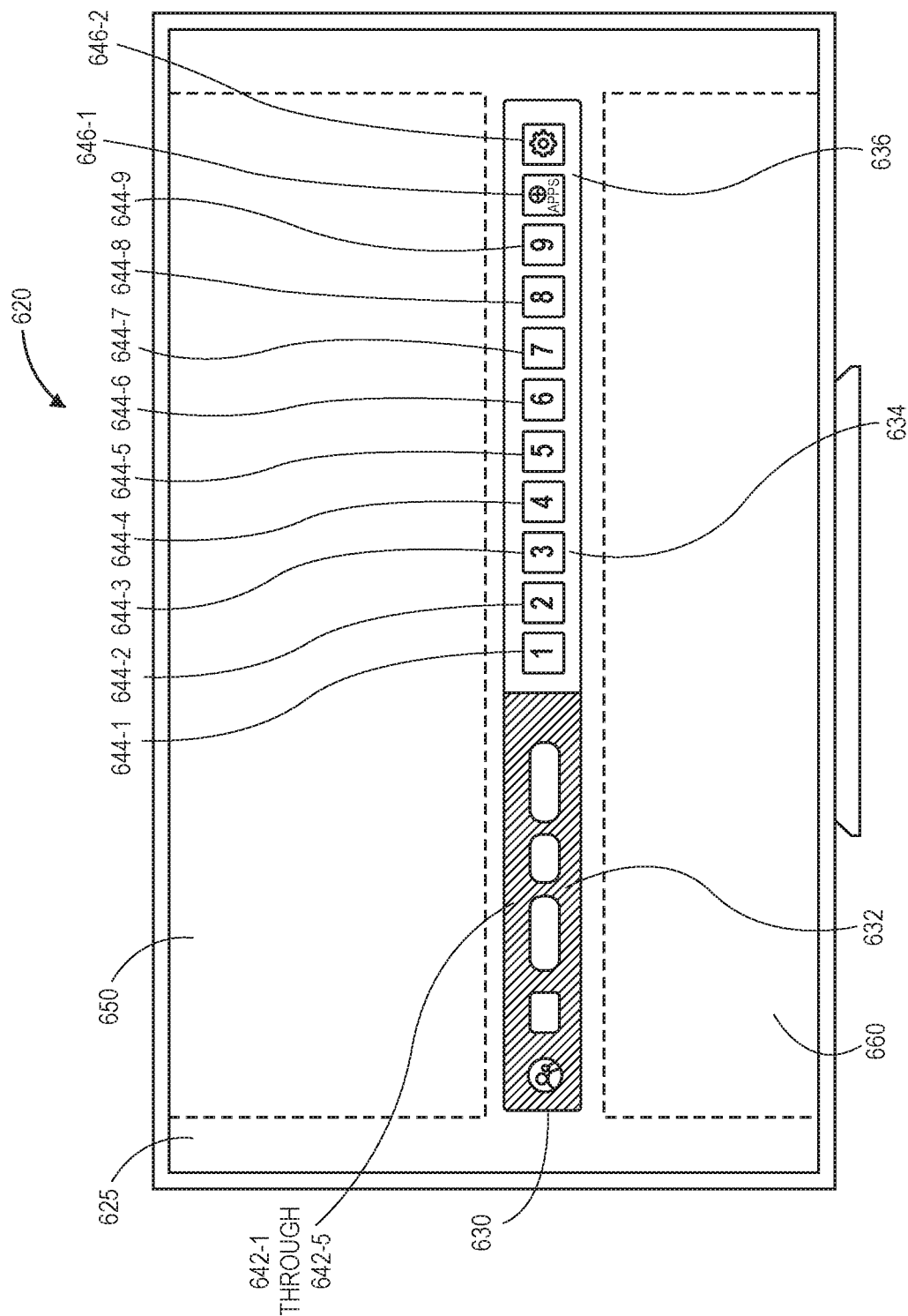
FIGS. 6A and 6B are views of aspects of one system for presenting options for selecting content in accordance with implementations of the present disclosure.
Figure 6B:
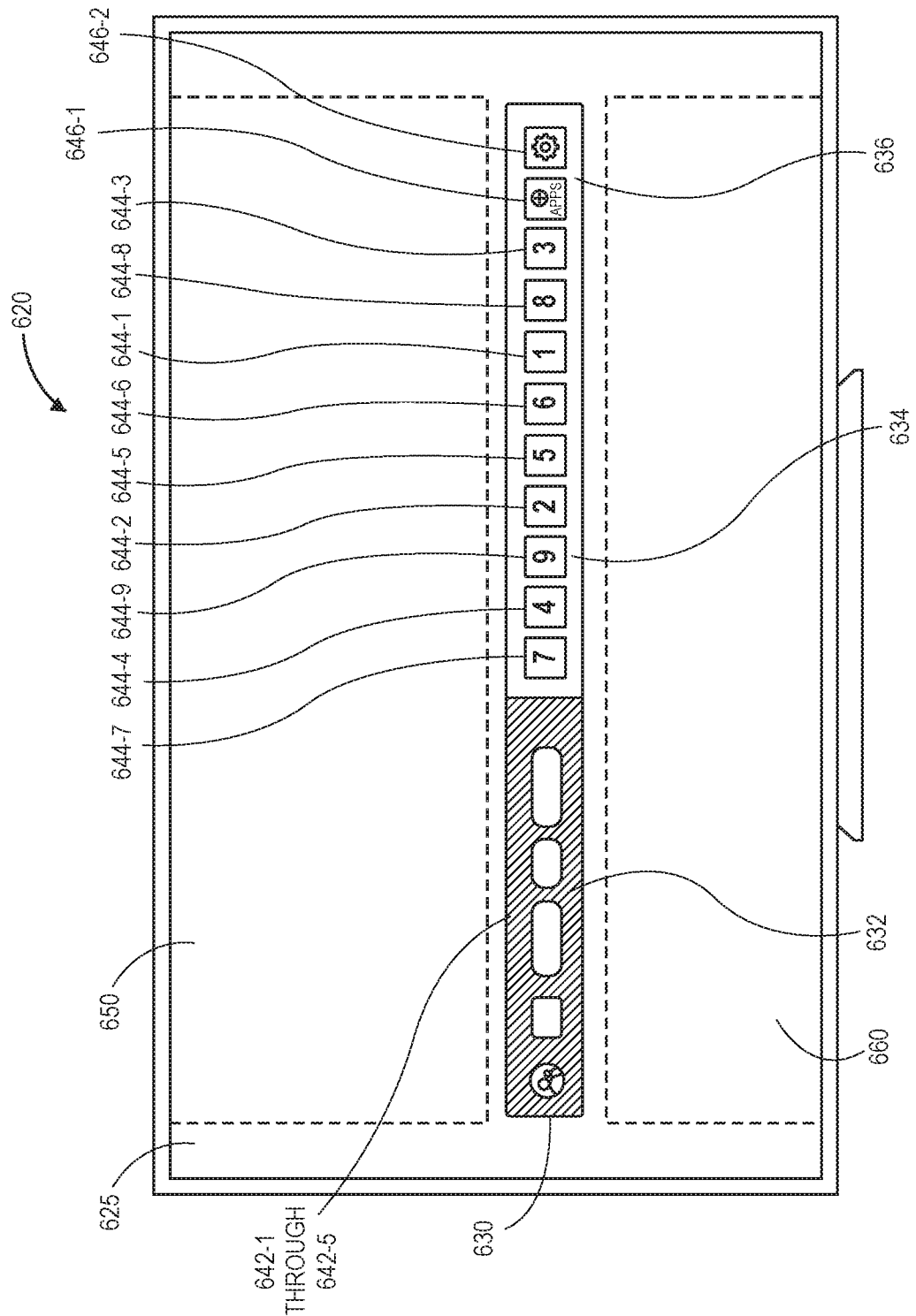

A navigation bar may include any number of elements, e.g., icons, buttons, sets of text, calls-to-action or other selectable features corresponding to browse destinations, applications or content sources, utility applications, or other features. The elements may be displayed within predefined sections of the navigation bar, and may be sorted, prioritized, ranked or otherwise ordered on any basis. Referring to FIGS. 6A and 6B, views of aspects of one system for presenting options for selecting content in accordance with implementations of the present disclosure are shown.

As is shown in FIG. 6A, a navigation bar 630 is located at or near a center of a display 625 of a personal device 620 (e.g., a television or monitor), and is aligned substantially horizontally, between a first content space (e.g. an upper content space) 650 above the navigation bar 630 and a second content space (e.g. a lower content space) 660 below the navigation bar 630. The navigation bar 630 includes a plurality of element zones (or sections) 632, 634, 636, including a first element zone 632 having a plurality of elements 642-1 through 642-5 corresponding to browse destinations provided at a left end of the navigation bar 630, a second element zone 634, and a third element zone 636 having a plurality of elements 646-1, 646-2 corresponding to utility applications.

As is further shown in FIG. 6A, the second element zone 634 includes a plurality of content elements 644-1, 644-2, 644-3, 644-4, 644-5, 644-6, 644-7, 644-8, 644-9 arranged in a predetermined order from left to right within the navigation bar 630, between the first element zone 632 and the third element zone 636. Each of the content elements 644-1, 644-2, 644-3, 644-4, 644-5, 644-6, 644-7, 644-8, 644-9 may correspond to an application, an input, a domain or another content source that is presented within the second element zone 634 of the navigation bar 630. The predetermined order of the content elements 644-1, 644-2, 644-3, 644-4, 644-5, 644-6, 644-7, 644-8, 644-9 may be determined on any basis, including how recently applications, inputs, services or other content sources corresponding to such elements were accessed via the navigation bar 630 or otherwise, a level of popularity of each of such content sources, or on any other basis. In some implementations, one or more of the content elements may correspond to preferred content sources, e.g., content sources that have paid a premium to be comparatively highly ranked, may be placed ahead of, or farther to the left than, one or more content elements corresponding to customer-selected content sources, or corresponding to content sources that are selected on any other basis (e.g., one or more business reasons). Additionally, in some implementations, the elements 644-1 through 644-9 may be shown in a carousel-type format.

Alternatively, the content elements 644-1, 644-2, 644-3, 644-4, 644-5, 644-6, 644-7, 644-8, 644-9 may be shown in an order that is customized or otherwise selected by a user of the personal device 620 or a media streaming device (not shown) in communication with the personal device 620. As is shown in FIG. 6B, the navigation bar 630 shows the content elements 644-7, 644-4, 644-9, 644-2, 644-5, 644-6, 644-1, 644-8, 644-3 arranged in a customized order which may be selected by a user of the personal device 620 and stored in one or more memory components or data stores. In some implementations, the locations of the first element zone 632 including the elements 642-1 through 642-5 corresponding to the browse destinations and the third element zone 636 including the elements 646-1, 646-2 corresponding to the utility applications, and the orders of such elements within such zones, may remain fixed, while the content elements within the second element zone 634 may be reordered by a user on any basis. In some other implementations, however, the locations of the first element zone 632, the second element zone 634 and the third element zone 636 may be modified by the user.

Figure 7:
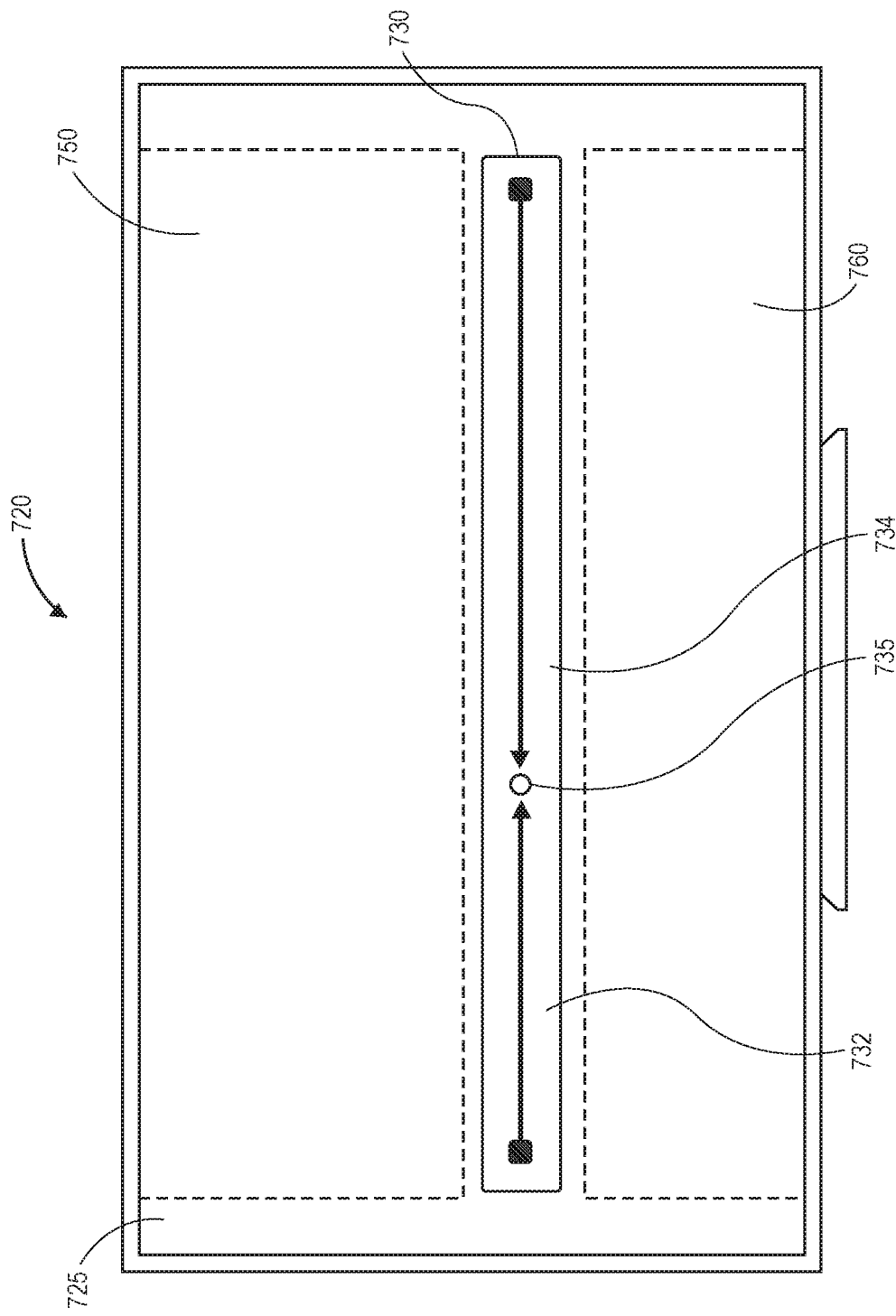
FIG. 7 is a view of aspects of one system for presenting options for selecting content in accordance with implementations of the present disclosure.

In some implementations, a navigation bar may include elements that are arranged in a flexible manner, such that zones accommodating elements corresponding to browse destinations, content sources or utility applications may expand or contract within the navigation bar, as necessary, to accommodate elements corresponding to preferred or prioritized content sources. Referring to FIG. 7, a view of aspects of one system for presenting options for selecting content in accordance with implementations of the present disclosure are shown.

As is shown in FIG. 7, a navigation bar 730 is located on a display 725 of a personal device 720 (e.g., a television or monitor), and is aligned substantially horizontally, between a first content space (e.g. an upper content space) 750 above the navigation bar 730 and a second content space (e.g. a lower content space) 760 below the navigation bar 730. The navigation bar 730 includes a plurality of element zones 732, 734, such as a first element zone 732 for accommodating elements corresponding to browse destinations, and a second element zone 734 for accommodating elements corresponding to content sources (e.g., content elements). In some implementations, the navigation bar 730 may also include a third element zone for accommodating elements corresponding to utility applications.

As is further shown in FIG. 7, the first element zone 732 provided at a left end of the navigation bar 730 and the second element zone 734 provided at a right end of the navigation bar 730 intersect at a collision point 735 within the navigation bar 735. The first element zone 732 may expand from left to right (or contract from right to left) as elements corresponding to browse destinations are added to (or removed from) the first element zone 732, while the second element zone 734 may expand from right to left (or contract from left to right) as elements corresponding to content sources are added to (or removed from the second element zone 734.

A location of the collision point 735 within the navigation bar 730 may be selected on any basis. Additionally, where elements corresponding to browse destinations within the first element zone 732 contact elements corresponding to content sources within the second element zone 734, e.g., at the collision point 735, one of the first element zone 732 or the second element zone 734 may be contracted, as necessary, in order to accommodate elements of the other of the first element zone 732 or the second element zone 734. For example, in some implementations, the elements corresponding to browse destinations within the first element zone 732 may be prioritized, and one or more elements corresponding to content sources may be removed in order to ensure that the elements corresponding to the browse destinations within the first element zone 732 are properly displayed. Alternatively, in some other implementations, elements corresponding to browse destinations may be removed from the first element zone 732 in order to ensure that the elements corresponding to the content sources within the second element zone 734 are properly displayed.

Figure 8A:
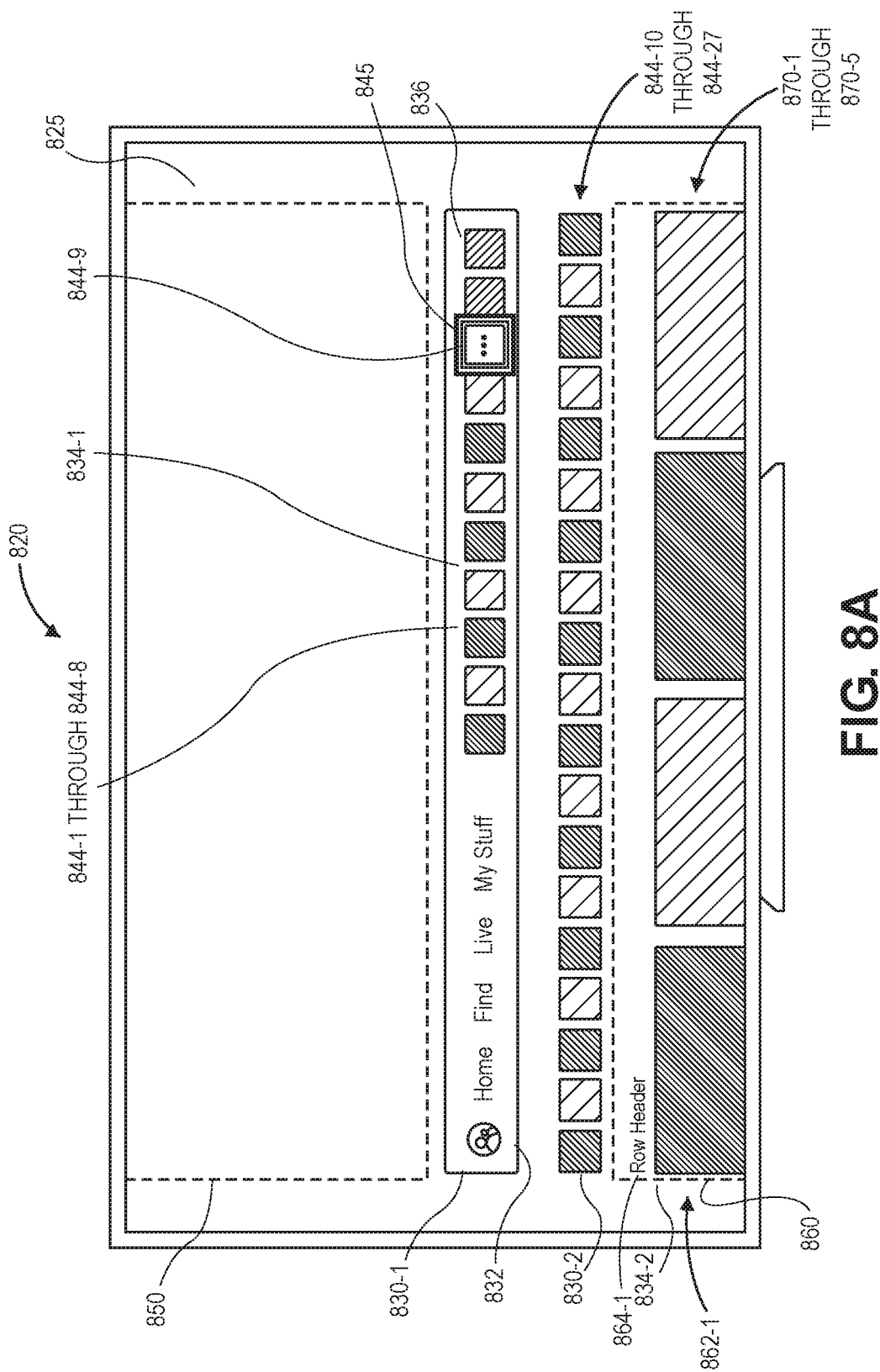
FIGS. 8A through 8C are views of aspects of one system for presenting options for selecting content in accordance with implementations of the present disclosure.
Figure 8B:
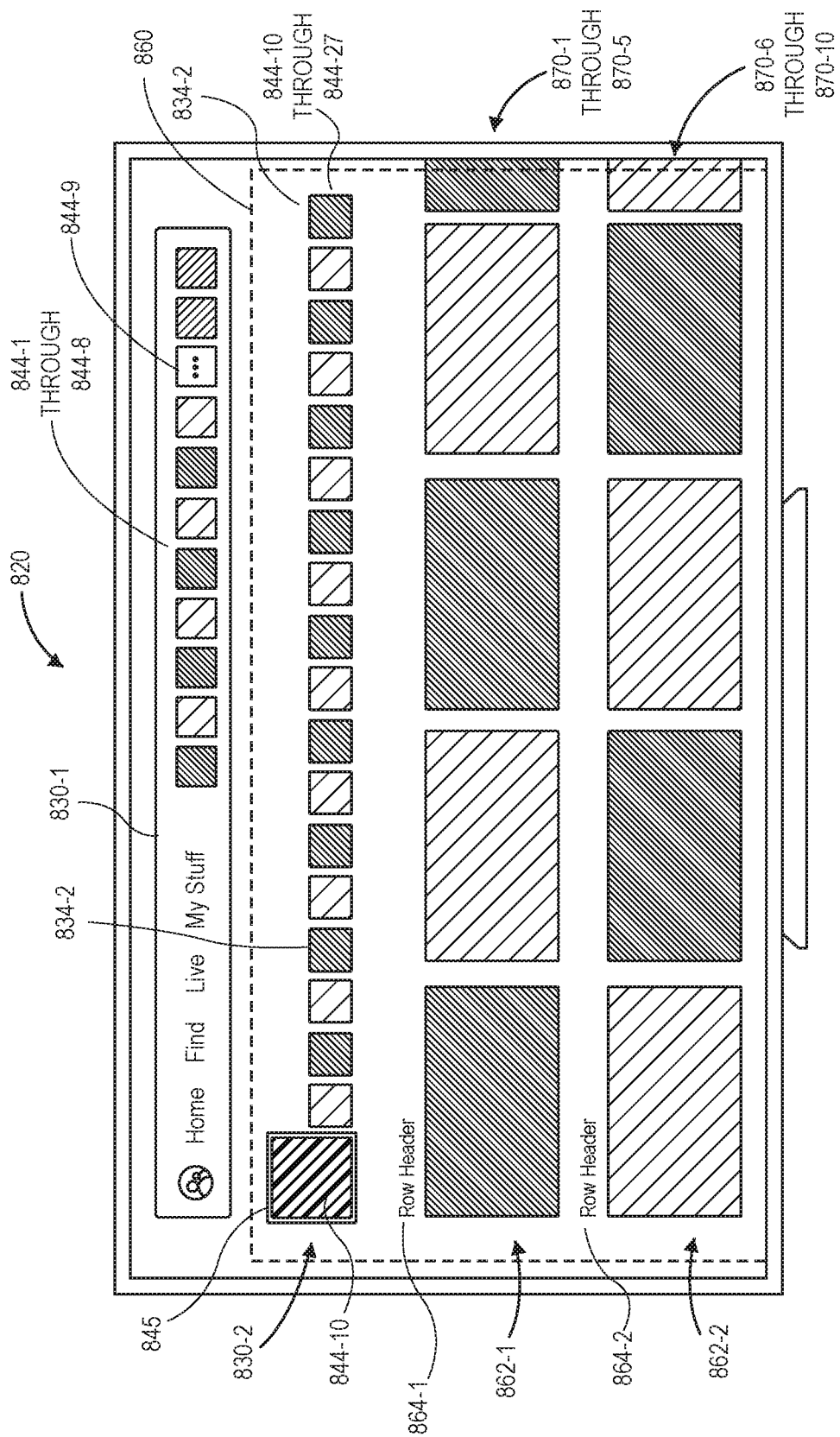
Figure 8C:
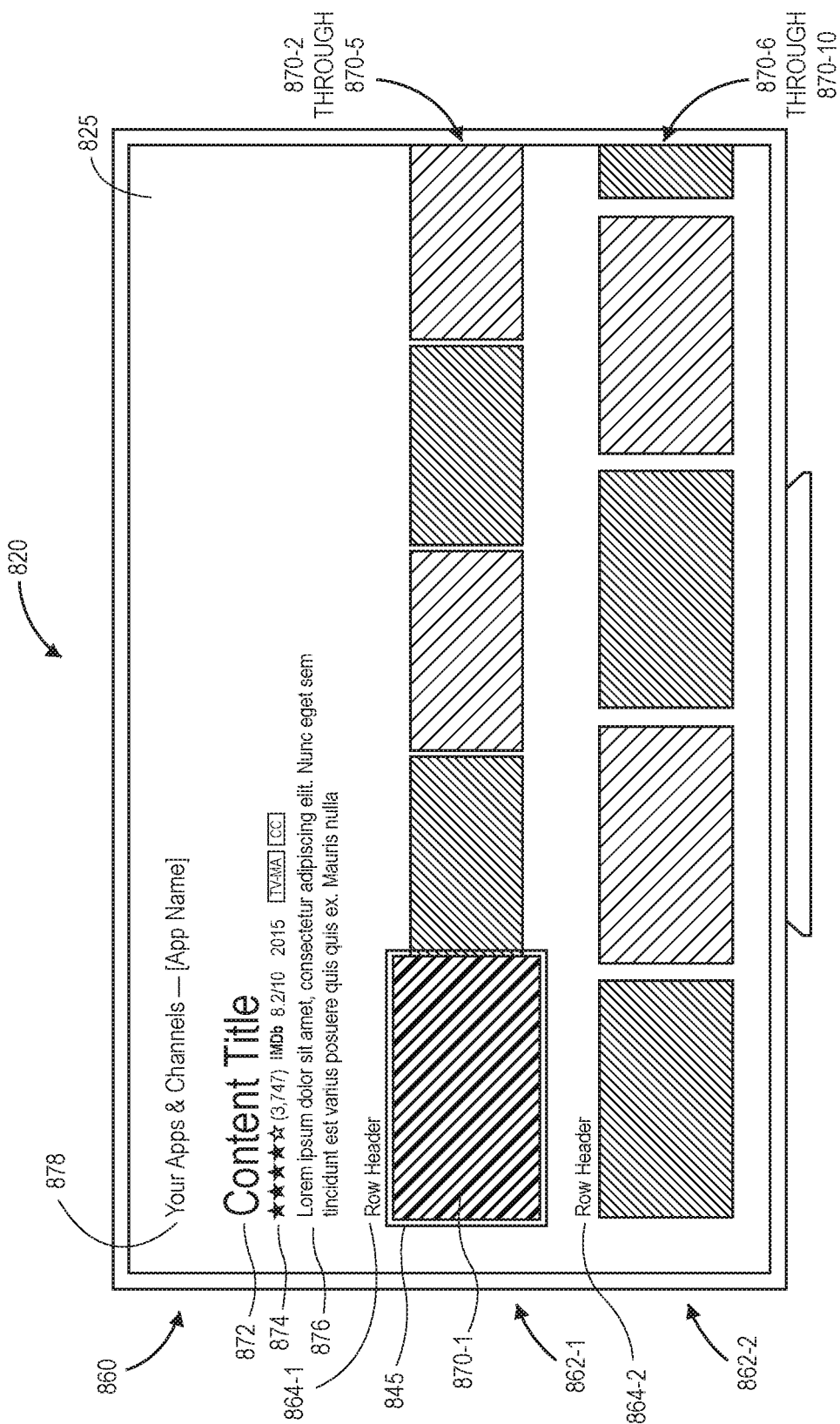

In some implementations, where a large number of elements are designated for inclusion within a navigation bar, such as where a user has designated several applications, content sources, or other features as preferred, or where several applications, content sources, or other features are identified as relevant to the user, one subset of such applications may be initially displayed within the navigation bar along with an expansion element, and the remaining applications may be displayed, e.g., beneath the navigation bar or in any other location, upon the selection of the expansion element. Referring to FIGS. 8A through 8C, views of aspects of one system for presenting options for selecting content in accordance with implementations of the present disclosure are shown.

As is shown in FIG. 8A, a personal device (e.g., a monitor or television) 820 includes a display 825 having a main navigation bar (or first navigation bar) 830-1, a first content section (or area or space) 850 above the main navigation bar 830-1 and a second content section (or area or space) 860 below the main navigation bar 830-1. The personal device 820 may be configured to receive content (e.g., media files of any type or form) from one or more networks, either directly or by way of a media streaming device (not shown). The main navigation bar 830-1 may be rendered on the display 825 by one or more applications executed by one or more processors operating on the personal device 820, or on a media streaming device (not shown) in communication with the personal device 820. As is further shown in FIG. 8A, the second content section 860 includes a first row 862-1 of tiles 870-1 through 870-5 including images corresponding to contextual or supplemental content that relates to or is available from one or more of the content sources. The first row 862-1 includes a first label 864-1 of a subject, a category, or a topic to which each of the tiles 870-1 through 870-5 in the first row 862-1 or the contextual or supplemental content to which such tiles relate.

As is shown in FIG. 8A, the main navigation bar 830-1 is displayed substantially centrally across the display 825, and aligned in a horizontal orientation. Alternatively, the main navigation bar 830-1 may be rendered in any location on the display 825, and in any orientation. The main navigation bar 830-1 includes a first content zone 832 for accommodating elements corresponding to browse destinations, a second element zone 834-1 for accommodating elements corresponding to content sources (e.g., content elements), and a third element zone 836 for accommodating elements corresponding to utility applications. In particular, the second element zone 834-1 includes a first set of elements 844-1 through 844-8 corresponding to seven content sources, which may be identified for or selected by a user on any basis, and an expansion element 844-9 for toggling a display of another navigation bar including additional elements corresponding to content sources.

For example, when a cursor (or another selection element) 845 is placed on the expansion element 844-9, e.g., a box, an outline or another shape on, over or around the expansion element 844-9, such as is shown in FIG. 8A, or when a user selects the expansion element 844-9 with the cursor 845 thereon, an auxiliary navigation bar (or second navigation bar) 830-2 is displayed proximate the main navigation bar 830-1. The auxiliary navigation bar 830-2 includes a fourth element section 834-2 for accommodating a second set of elements 844-10 through 844-27 corresponding to content sources, and is aligned in a horizontal orientation, e.g., in parallel with the main navigation bar 830-1. Therefore, by including the expansion element 844-9 within the navigation bar 830-1, the capacity for enabling a user to access elements corresponding to content sources is greatly enhanced. Although FIG. 8A includes only a single auxiliary navigation bar 830-2 having a single set of additional content elements, the systems and methods of the present disclosure may cause any number of auxiliary navigation bars, having any number of sets of additional content elements, to be displayed upon placing the cursor 845 on any number of expansion elements within one or more other navigation bars, or upon selecting such expansion elements. For example, in some implementations, the auxiliary navigation bar 830-2 shown in FIG. 8A may also include an expansion element that, when the cursor 845 is placed thereon, causes another auxiliary navigation bar having another set of content elements therein to be displayed on the display 825.

As is shown in FIG. 8B, when a user moves the cursor 845 onto an element 844-10 within the auxiliary navigation bar 830-2, the main navigation bar 830-1 ascends to a top edge of the display 825, and the second content section 860 expands to occupy a balance of space below the main navigation bar 830-1. Placing the cursor 845 onto the element 844-10 causes the element 844-10 to expand in size, relative to the other elements 844-1 through 844-8 and 844-10 through 844-27, and a second row 862-2 including a second set 870-6 through 870-10 of tiles including images corresponding to contextual or supplemental content relating to one or more of the content sources and a second label 864-2 of a subject, a category, or a topic to which each of the tiles 870-6 through 870-10 in the second row 862-2 or the contextual or supplemental content to which such tiles 870-1 through 870-5 relates. Alternatively, or additionally, any visual effects may be applied to the element 844-10 or other elements, e.g., by changes in color or illumination, or any other visual effects.

In some implementations, the elements 844-1 through 844-8 and 844-10 through 844-27 may be preferentially ranked on any basis, and the element 844-1 may be an element that is most highly ranked of the elements 844-10 through 844-27 not included in the main navigation bar 830-1. Moreover, in some other implementations, the display 825 may appear as shown in FIG. 8B when the user selects the expansion element 844-9, such that the element 844-10, e.g., the highest-ranking element within the auxiliary navigation bar 830-2, is shown in expanded size and the tiles 870-6 through 870-10 are selected based on the element 844-10.

The second set 870-6 through 870-10 of tiles may represent aspects of the element 844-10 or a corresponding content source that are selected on any basis. For example, where the element 844-10 corresponds to an application, an input, a domain or any other source of television programs or movies, the images shown in the second set 870-6 through 870-10 may depict scenes from one or more of such television programs or movies. Where the element 844-10 corresponds to a source of content regarding sports, sporting events, athletes or teams, the images shown in the second set 870-6 through 870-10 may depict preferred one or more sports, events, athletes or teams, or like images. Where the element 844-10 corresponds to a source of content regarding video games, the images shown in the second set 870-6 through 870-10 may depict one or more scenes of a video game available from the source of content. Alternatively, or additionally, the images shown in the second set 870-6 through 870-10 may depict any other aspect of content available from a content source corresponding to the element 844-10.

As is shown in FIG. 8C, after the user moves the cursor 845 onto or otherwise selects a tile 870-1 within the first row 862-1, the main navigation bar 830-1 and the auxiliary navigation bar 830-2 are removed from the display 825, and replaced by additional information regarding content associated with the tile 870-1, including a title (or other label) 872, ratings or other information 874, and a summary 876 of the content associated with the tile 870-1. Additionally, a bread crumb 878, or a navigation trail or aid, identifying a path or set of actions followed in order to cause the display 825 to appear as shown in FIG. 8C, is also provided.

Figure 9:
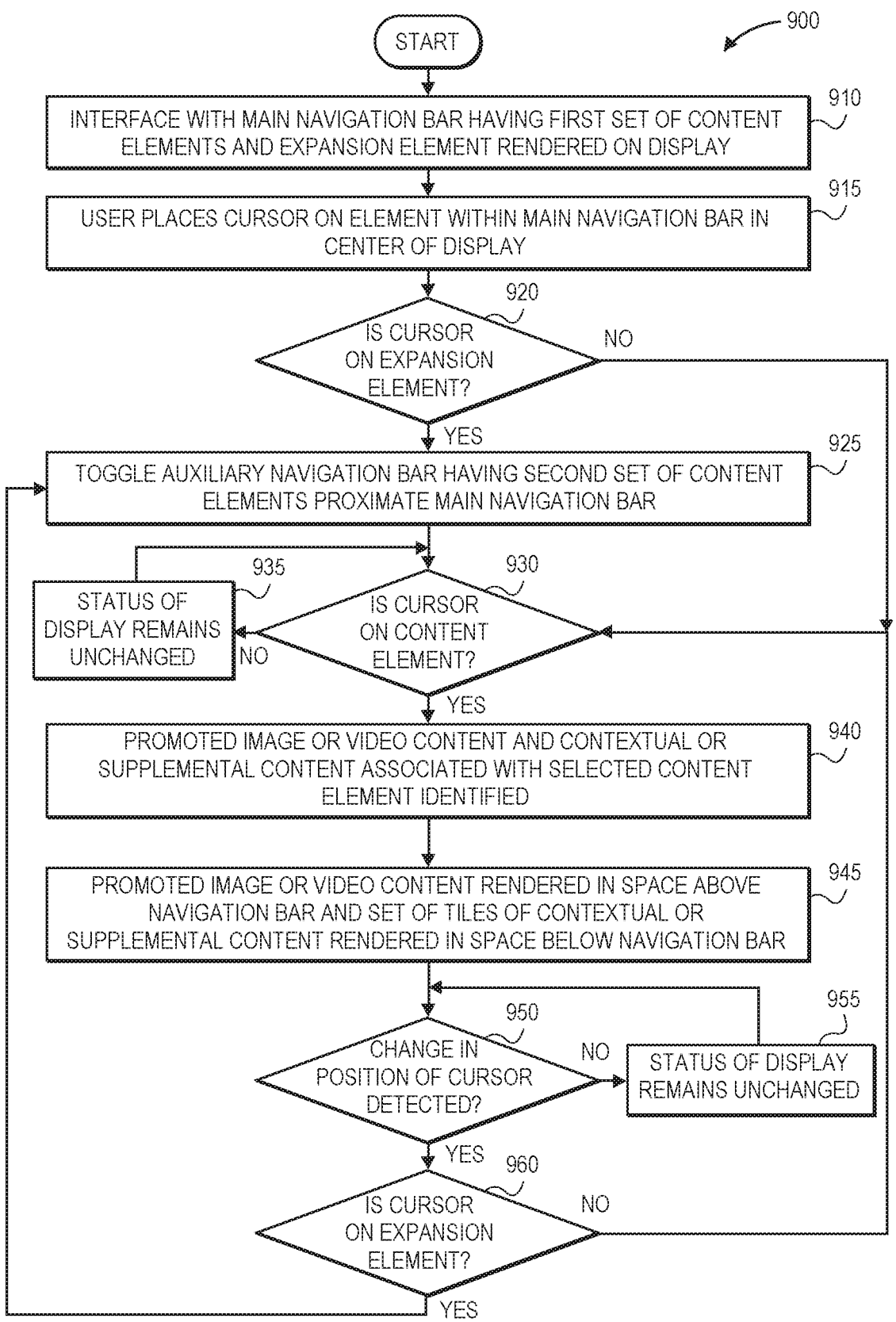
FIG. 9 is a flow chart of one process for presenting options for selecting content in accordance with implementations of the present disclosure.

Referring to FIG. 9 is a flow chart 900 of one process for presenting options for selecting content in accordance with implementations of the present disclosure. At box 910, an interface having a main navigation bar with a first set of content elements (e.g., elements associated with any applications, inputs, services or other content sources) and an expansion element is rendered on a display. For example, the main navigation bar may have icons, buttons, sets of text, calls-to-action or other selectable features associated not only with the first set of content elements but also with one or more browse destinations, utility applications, or other features. The main navigation bar may be provided horizontally, and in a center of the display, or, alternatively, in any other location or orientation on the display. The expansion element may be an element having a similar size or shape to one or more of the content elements, or a different size or shape, and may be configured to toggle the display of one or more other navigation bars when the expansion element is selected.

At box 915, the user places a cursor or another selection element on an element within the main navigation bar, and at box 920, whether the cursor is on the expansion element is determined. If the cursor is located on the expansion element, then the process advances to box 925, where an auxiliary navigation bar having a second set of content elements is toggled, e.g., displayed if the auxiliary navigation bar is not shown, or removed if the auxiliary navigation bar is shown. The first set of content elements and the second set of content elements may be selected on any basis, including but not limited to a ranking or priority of the content elements previously established by the user or another entity (e.g., a vendor or operator of a media streaming device or service), as well as any other time-based or contextual reference. For example, an application for displaying football-related content may be preferentially ranked more highly than an application for displaying live music in the fall, when football is common and outdoor concerts are rare, and less highly in the summer, when football is not played and when outdoor concerts are common. Content elements may be sorted, arranged or divided into at least the first set and the second set on any basis.

If the cursor is not on the expansion element at box 920, or after the auxiliary navigation bar has been toggled at box 925, then the process advances to box 930, where whether the cursor has been moved onto a content element is determined. For example, the cursor may be moved laterally and/or vertically to one of the content elements of the first set in the main navigation bar or, alternatively, to one of the content elements of the second set in the auxiliary navigation bar, if the auxiliary navigation bar is displayed. If the cursor has not been moved onto a content element, then the process advances to box 935, where the status of the display remains unchanged. If the cursor has been moved onto a content element, however, then the process advances to box 940, where a promoted image or video content and contextual or supplemental content associated with the content element are identified.

The promoted image or video content may be selected on any basis, and may bear any relation to the content element or an application or other content source with which the content element is associated. For example, where the content element corresponds to a media viewing application, the promoted image or video content may relate to a program that is recommended for the user, or a program that is timely or relevant, a program that is popular among one or more other users that share one or more attributes in common with the user, or on any other basis. Where the content element corresponds to a video game, the promoted image or video content may include a banner or one or more other images from the video game. Where the content element is a music streaming application, the promoted image or video content may include an image of an artist, an album cover, or scenes from a music video, or images that are associated with music genres or styles.

Additionally, the promoted image or video content may further include one or more titles, descriptions, ratings, or summaries of the promoted image or video content, or one or more icons, buttons, other sets of text, calls-to-action, or any selectable features (e.g., titles of movies, television programs or video games, as well as selectable features for launching the movies, television programs or video games).

The contextual or supplemental content may include discrete tiles associated with one or more attributes of the content element or an application with which the content element is associated. For example, where the content element corresponds to a media viewing application, the contextual or supplemental content may include screen shots or images of specific programs that are available from the media viewing application, along with titles, names of artists, actors or actresses, or categories with which such programs are associated. Where the content element corresponds to a video game, the contextual or supplemental content may include images of characters of the video game, scenes of the video game, or aspects or attributes of the video game. Where the content element corresponds to a music streaming application, the contextual or supplemental content may include images of album covers, artists, or images associated with specific music genres or styles.

At box 945, the promoted image or video content is rendered in a space above the main navigation bar and a set of tiles of the contextual or supplemental content is rendered in a space below the main navigation bar or auxiliary navigation bar. For example, the promoted image or video content may be shown or displayed in a space along with any selectable features for activating the application corresponding to the content element. The navigation bar may be aligned substantially horizontally and substantially centrally within the display, or in any other location or orientation on the display. Additionally, in some implementations, the set of tiles may be shown in a single row below the navigation bar, or in multiple rows, and the tiles may be visible in their entirety or as portions thereof. Moreover, the set of tiles may be sorted or categories in any manner, and may include one or more labels or identifiers of the set or a category thereof.

At box 950, whether a change in a position of the cursor is detected is determined. For example, the cursor may be moved from one content element within the main navigation bar or the auxiliary navigation bar, if the auxiliary navigation bar is displayed, or to an element corresponding to browse destination or a utility application. Alternatively, the cursor may be moved to the promoted image or video content above the main navigation bar, or to one or more of the set of tiles of the contextual or supplemental content below the main navigation bar or the auxiliary navigation bar. If a change in the position of the cursor is not detected, the process advances to box 955, where the status of the display remains unchanged.

If a change in the position of the cursor is detected, then the process advances to box 960, where whether the cursor is on the expansion element is determined. If the cursor is on the expansion element, then the process returns to box 925, where the auxiliary navigation bar having a set of content elements is toggled proximate the main navigation bar, e.g., displayed if the auxiliary navigation bar is not shown, or removed if the auxiliary navigation bar is shown. If the cursor is not on the expansion element, then the process returns to box 930, where whether the cursor is on another content element is determined.

One or more elements of the process shown in the flow chart 900 of FIG. 9 may be repeated, as necessary, until one of the applications is activated, e.g., by interaction with one or more selectable features within the promoted image or video content, or with one or more of the set of tiles of the contextual or supplemental content, or upon the occurrence of any events, e.g., turning off a television system or media streaming system, or any other events.

Figure 10:
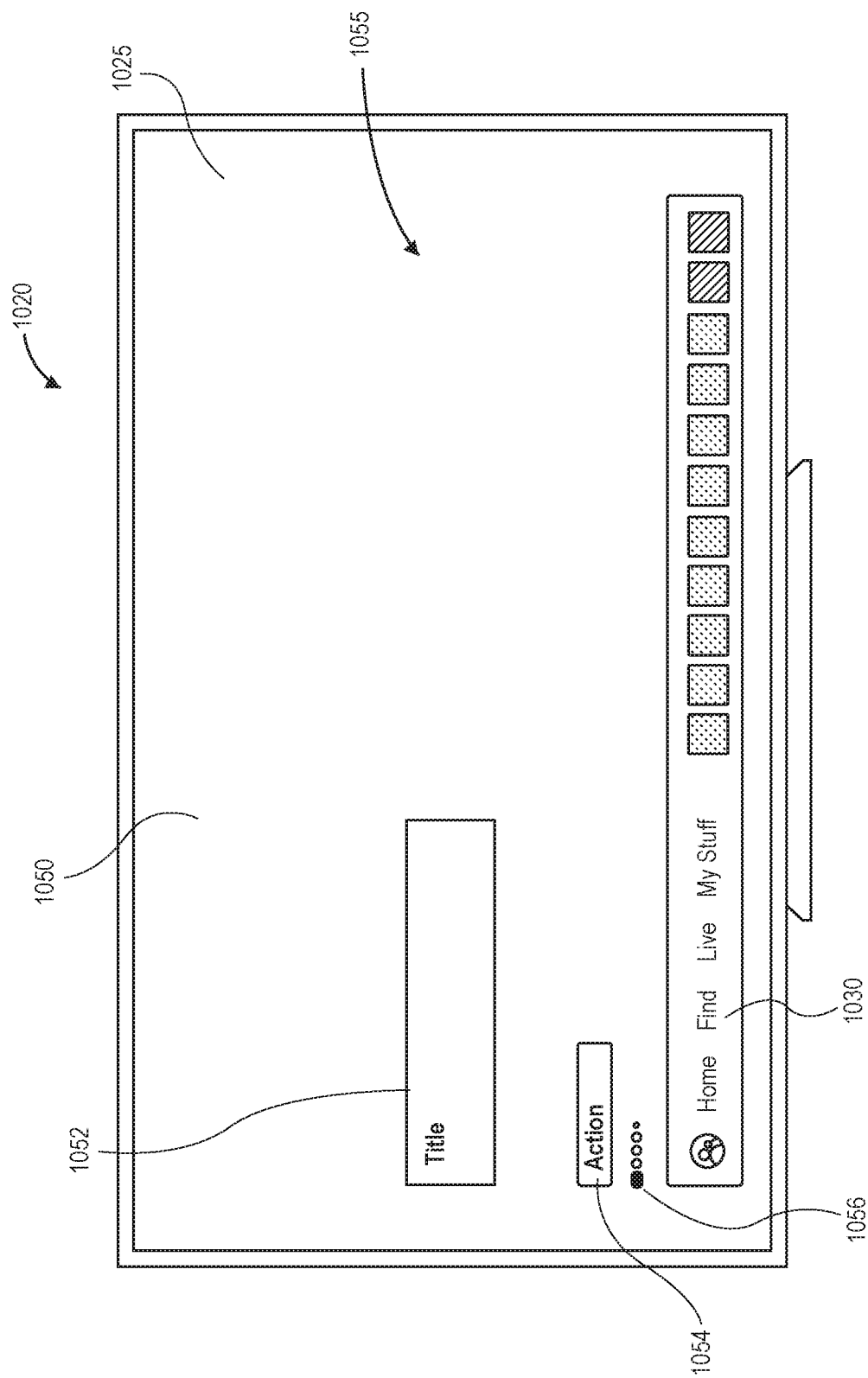
FIG. 10 is a view of aspects of one system for presenting options for selecting content in accordance with implementations of the present disclosure.

In accordance with implementation of the present disclosure, information regarding content that is specifically targeted to a user, or has been otherwise identified as relevant to the user or similarly situated users, may be presented in a space above a navigation bar, along with information, data or metadata regarding the content, and one or more interactive features for activating the content. Referring to FIG. 10, a view of aspects of one system for presenting options for selecting content in accordance with implementations of the present disclosure are shown.

As is shown in FIG. 10, a personal device (e.g., a monitor or television) 1020 includes a display 1025 having a navigation bar 1030 and a content section (or area or space) 1050 above the navigation bar 1030. The personal device 1020 may be configured to receive content (e.g., media files of any type or form) from one or more networks, either directly or by way of a media streaming device (not shown). The navigation bar 1030 may be rendered on the display 1025 by one or more applications executed by one or more processors operating on the personal device 1020, or on a media streaming device (not shown) in communication with the personal device 1020. As is shown in FIG. 10, the navigation bar 1030 includes a plurality of elements (e.g., icons, buttons, sets of text, calls-to-action or other selectable features) corresponding to browse destinations, content sources, utility applications, or other features of the personal device 820 or a media streaming device (not shown).

As is further shown in FIG. 10, the content section 1050 includes a title (or other label) 1052 of content, as well as a call-to-action button or another selectable feature 1054 for activating the content, and a delineation feature (or pagination feature) 1056 applied over a representative image 1055.

In some implementations, the delineation feature 1056 may act as a visual indicator of which of a series of sets of content is represented in the content section 1050. Alternatively, the representative image 1055 may be a single image, or a series of images, e.g., a video stream, relating to a set of promoted images or video content. For example, the representative image may relate to a content source corresponding to one of the elements within the navigation bar on which a cursor or another selection element was previously located.

In some implementations, the sets of content represented in the content section 1050, and the corresponding title 1052, call-to-action button 1054, and representative image 1055 for such content, may automatically rotate or be replaced with another set of content after a predetermined time and the delineation feature 1056 may be updated accordingly. Alternatively, a user may select another of the sets of content relating to the content source via the delineation feature 1056.

Information regarding content that is targeted to a user may be initially presented to a customer in a space associated with a navigation bar that is provided in a substantially central location on a display with a title (or other label), a representative image (or stream of images), and other text-based or visual descriptions of the content. When a cursor or another selection element is moved into the space, the navigation bar may be moved to an edge of the display, or alternatively removed from the display, and the space may expand to show the information in a larger or different form. Referring to FIGS. 11A and 11B, views of aspects of one system for presenting options for selecting content in accordance with implementations of the present disclosure are shown.

As is shown in FIG. 11A, a personal device (e.g., a monitor or television) 1120 includes a display 1125 having a navigation bar 1130, a first content section (or area or space) 1150 above the navigation bar 1130 and a second content section (or area or space) 1160 below the navigation bar 1130. The personal device 1120 may be configured to receive content (e.g., media files of any type or form) from one or more networks, either directly or by way of a media streaming device (not shown). The navigation bar 1130 may be rendered on the display 1125 by one or more applications executed by one or more processors operating on the personal device 1120, or on a media streaming device (not shown) in communication with the personal device 1120. As is shown in FIG. 11A, the navigation bar 1130 is displayed substantially centrally across the display 1125, and in a horizontal orientation. Alternatively, the navigation bar 1130 may be rendered in any location on the display 1125, and in any orientation.

As is also shown in FIG. 11A, a representative image 1155-1 of content is displayed in the first content section 1150 above the navigation bar 1130, along with a title 1152 or other label of the content, a call-to-action button 1154 for activating the content, and a delineation feature 1156 visually identifying the content among a series of sets of content. The representative image 1155-1 may be selected on any basis, e.g., based on one or more attributes of the user, or one or more known or predicted preferences of the user, such as a viewing or purchasing history of the user, or on any other basis.

When a user places a cursor (or another selection element) 1145 on a content element 1144 within the navigation bar 1130, the second content section 1160 may include one or more tiles (not shown) including representative images corresponding to contextual or supplemental content relating to the content corresponding to the content element 1144. For example, where the content element 1144 corresponds to an application, an input, a domain, or another content source for displaying television programs, movies or sporting events, the second content section 1160 may include representative images of specific programs, movies or sporting events, such as programs, movies or sporting events in a common category.

As is shown in FIG. 11B, when a user places the cursor 1145 at a location within the first content section 1150, e.g., onto the call-to-action button 1154, the navigation bar 1130 descends to a bottom edge of the display 1125, and the first content section 1150 expands to occupy a balance of the space on the display 1125. Additionally, a representative image 1155-2 of the content, which may be an enlarged or expanded version of the representative image 1155-1 of FIG. 11A or a different image, is shown on the display 1125, as a background to the title 1152, the call-to-action button 1154 or the delineation feature 1156, which are similarly relocated within the first content section 1150 as the navigation bar 1130 descends to the bottom edge of the display 1125.

Depending on a configuration of a navigation bar or a position of a cursor, content that is selected for presentation to a user, e.g., within a content space provided above a navigation bar, or on a display, may be selected on any basis. Referring to FIGS. 12A through 12E, views of aspects of one system for presenting options for selecting content in accordance with implementations of the present disclosure are shown.

Figure 12A:
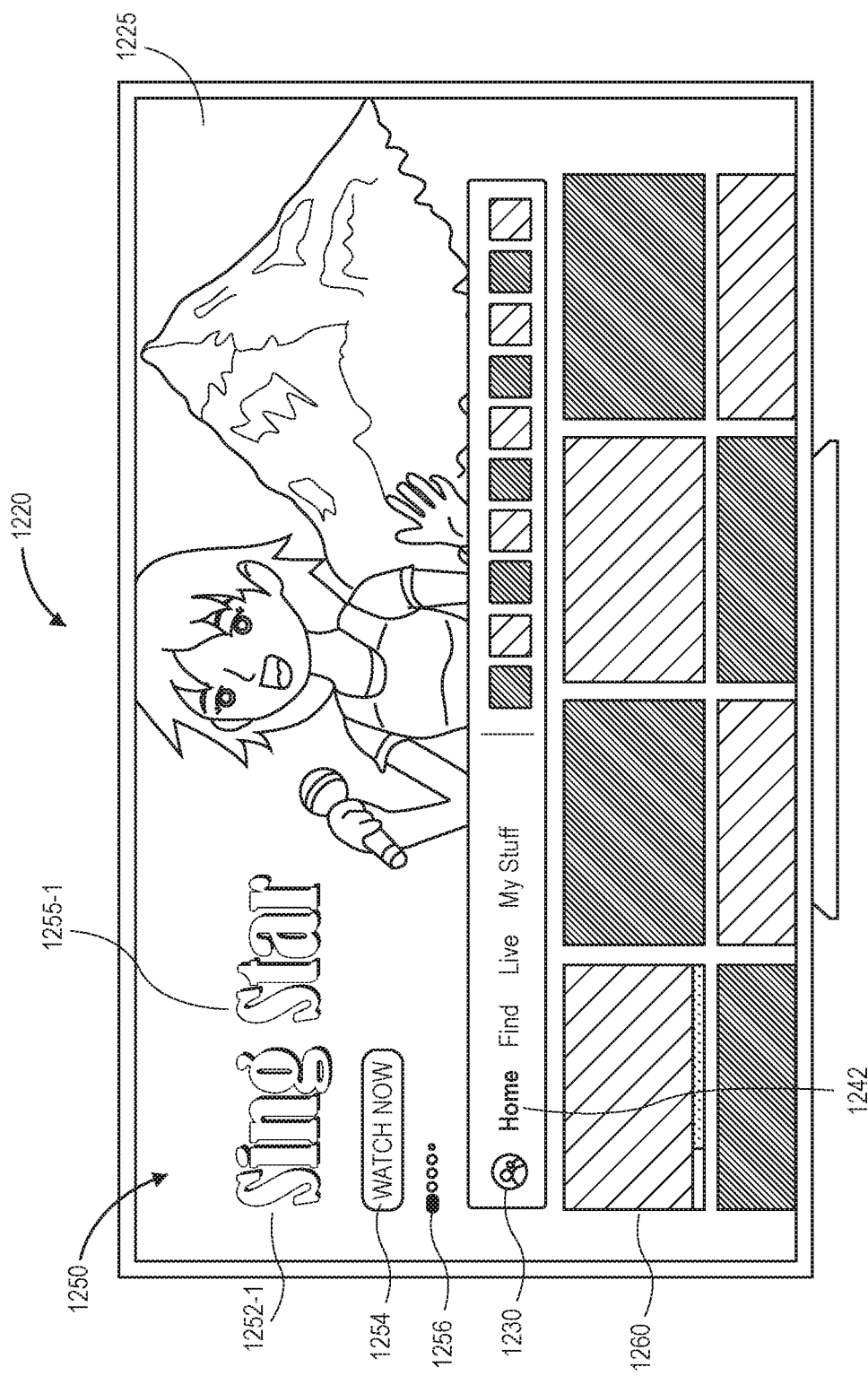

As is shown in FIG. 12A, a personal device (e.g., a monitor or television) 1220 includes a display 1225 having a navigation bar 1230, a first content section (or area or space) 1250 above the navigation bar 1230 and a second content section (or area or space) 1260 below the navigation bar 1230. The personal device 1220 may be configured to receive content (e.g., media files of any type or form) from one or more networks, either directly or by way of a media streaming device (not shown). The navigation bar 1230 includes a plurality of elements, e.g., selectable features corresponding to at least a browse destination 1242 corresponding to a "Home" screen, and an element 1244 corresponding to a content source. The navigation bar 1230 may be rendered on the display 1225 by one or more applications executed by one or more processors operating on the personal device 1220, or on a media streaming device (not shown) in communication with the personal device 1220. As is shown in FIG. 12A, the navigation bar 1230 is displayed substantially centrally across the display 1225, and in a horizontal orientation. Alternatively, the navigation bar 1230 may be rendered in any location on the display 1225, and in any orientation.

As is also shown in FIG. 12A, a representative image 1255-1 relating to content available from one or more applications is displayed in the first content section 1250 above the navigation bar 1230, along with a title 1252-1 or other label of the content, a call-to-action button 1254 for activating the content, and a delineation feature 1256 visually identifying the content among a series of sets of content. Alternatively, the representative image 1255-1 may be a series of images, e.g., a video file, such as a trailer or other media. Likewise, in addition to the title 1252-1, any other information or data may also be presented above the navigation bar 1230, e.g., descriptions, ratings, or summaries. Alternatively, in some implementations, the representative image 1255-1, the title 1252-1 or the call-to-action button 1254 may be or relate to an advertisement of any kind, an announcement (e.g., public service announcements), news, sports, weather, or any other information that need not relate to any elements within the navigation bar 1230 or content available from one or more of applications corresponding to such elements.

The second content section 1260 may feature one or more tiles including representative images corresponding to contextual or supplemental content associated with the application corresponding to the content element 1244. For example, where the content element 1244 corresponds to an application, an input, a domain, or another content source for displaying television programs, movies or sporting events, the second content section 1260 may include representative images (e.g., screen shots or other still images) of specific programs, movies or sporting events, such as programs, movies or sporting events in a common category. Alternatively, the tiles may depict series of images, e.g., video files, such as a trailer or other media relating to such programs, movies or sporting events in the common category.

As is shown in FIG. 12B, when a user moves a cursor (or another selection element) 1245 into the first content section 1250, e.g., onto the call-to-action button 1254 or elsewhere, the navigation bar 1230 descends to a bottom edge of the display 1225, and the first content section 1250 expands to occupy a balance of the space on the display 1225. Additionally, a representative image 1255-2, which may be an enlarged or expanded version of the representative image 1255-1 of FIG. 12A or a different image, is shown on the display 1225, as a background to the title 1252-1, the call-to-action button 1254 or the delineation feature 1256, which are similarly relocated within the first content section 1250 as the navigation bar 1230 descends to the bottom edge of the display 1225. Alternatively, the representative image 1255-2 may also be a series of images, e.g., a video file, such as a trailer or other media.

Figure 12C:
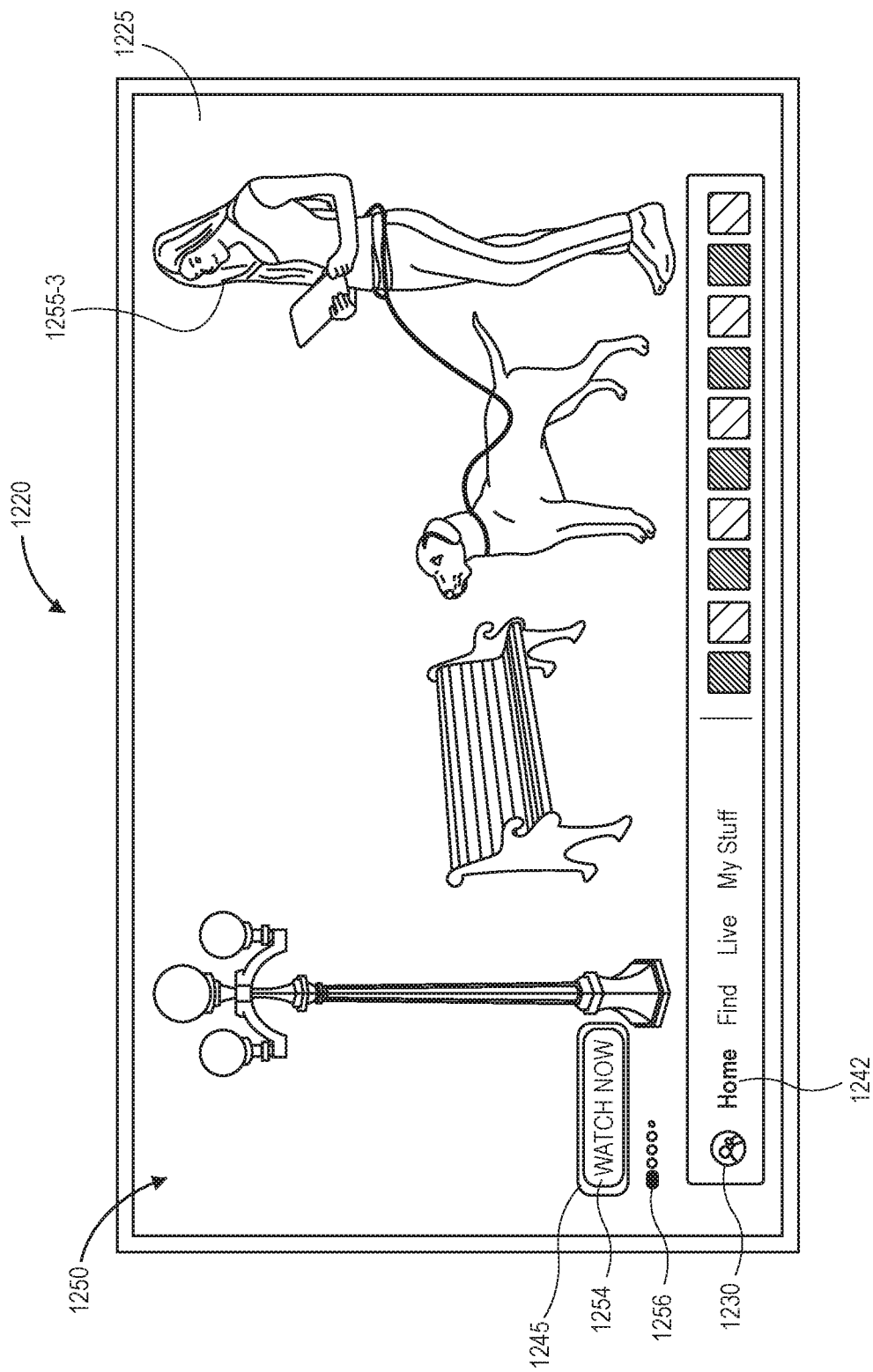

As is shown in FIG. 12C, after a predetermined period of time, or upon the occurrence of one or more other events, such as an activation or selection of the call-to-action button 1254, content 1255-3 may begin playing within the first content section 1250. The content 1255-3 may but need not be associated with the representative images 1255-1, 1255-2. When the content 1255-3 begins playing, the title 1252-1 is removed from the display 1225, along with any other information or data, while the call-to-action button 1254 and the delineation feature 1256 remain.

Figure 12D:
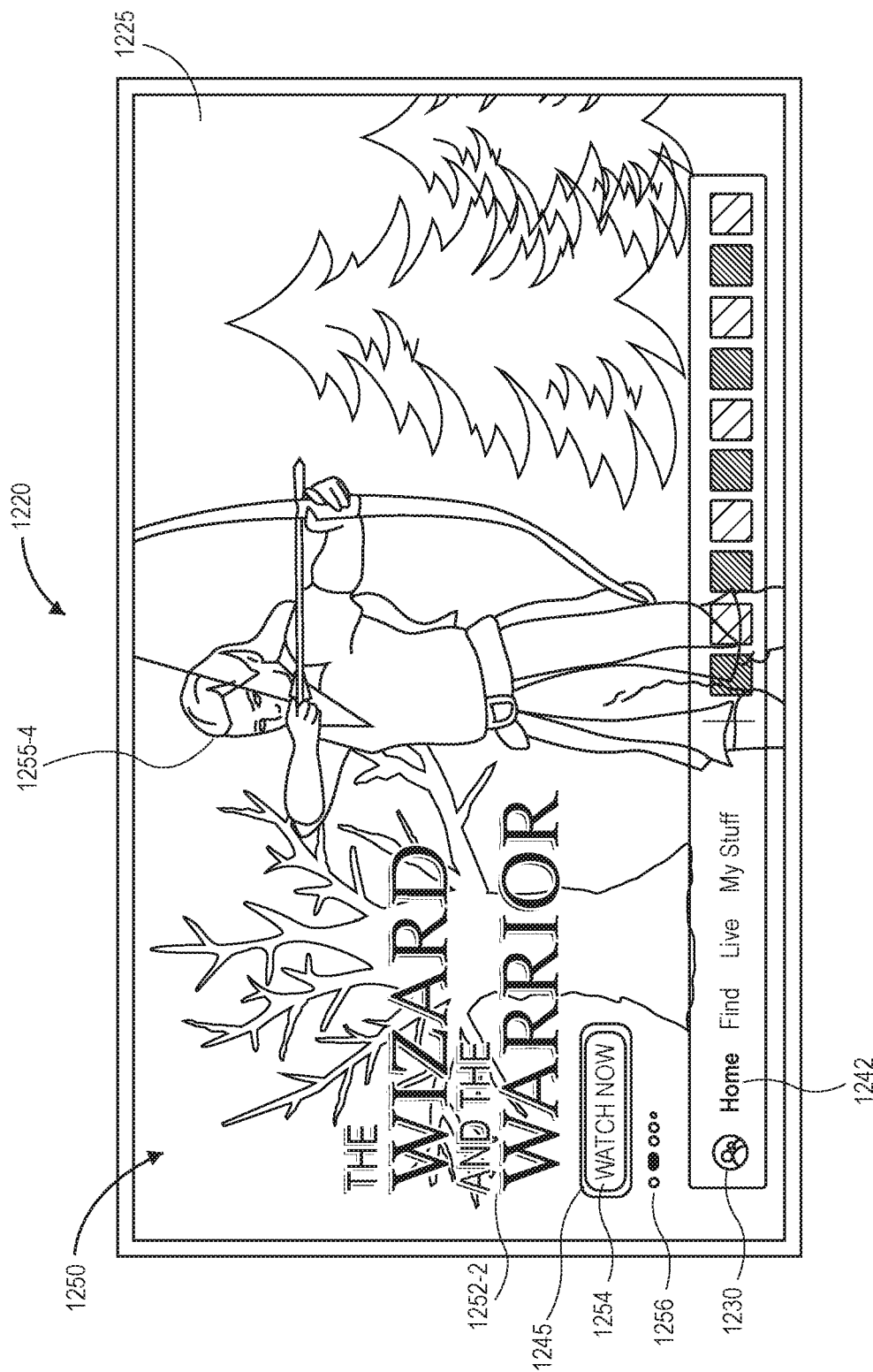

As is shown in FIG. 12D, after the presentation of the content 1255-3 shown in FIG. 12C is complete, or upon the occurrence of one or more other events, another representative image 1255-4 is shown in the first content section 1250 above the navigation bar 1230, along with a title 1252-2, and the call-to-action button 1254. Additionally, the delineation feature 1256 is updated to reflect that the representative image 1255-4 and the title 1252-2 are associated with content that is different from the content 1255-3 that was presented as shown in FIG. 12C.

Figure 12E:
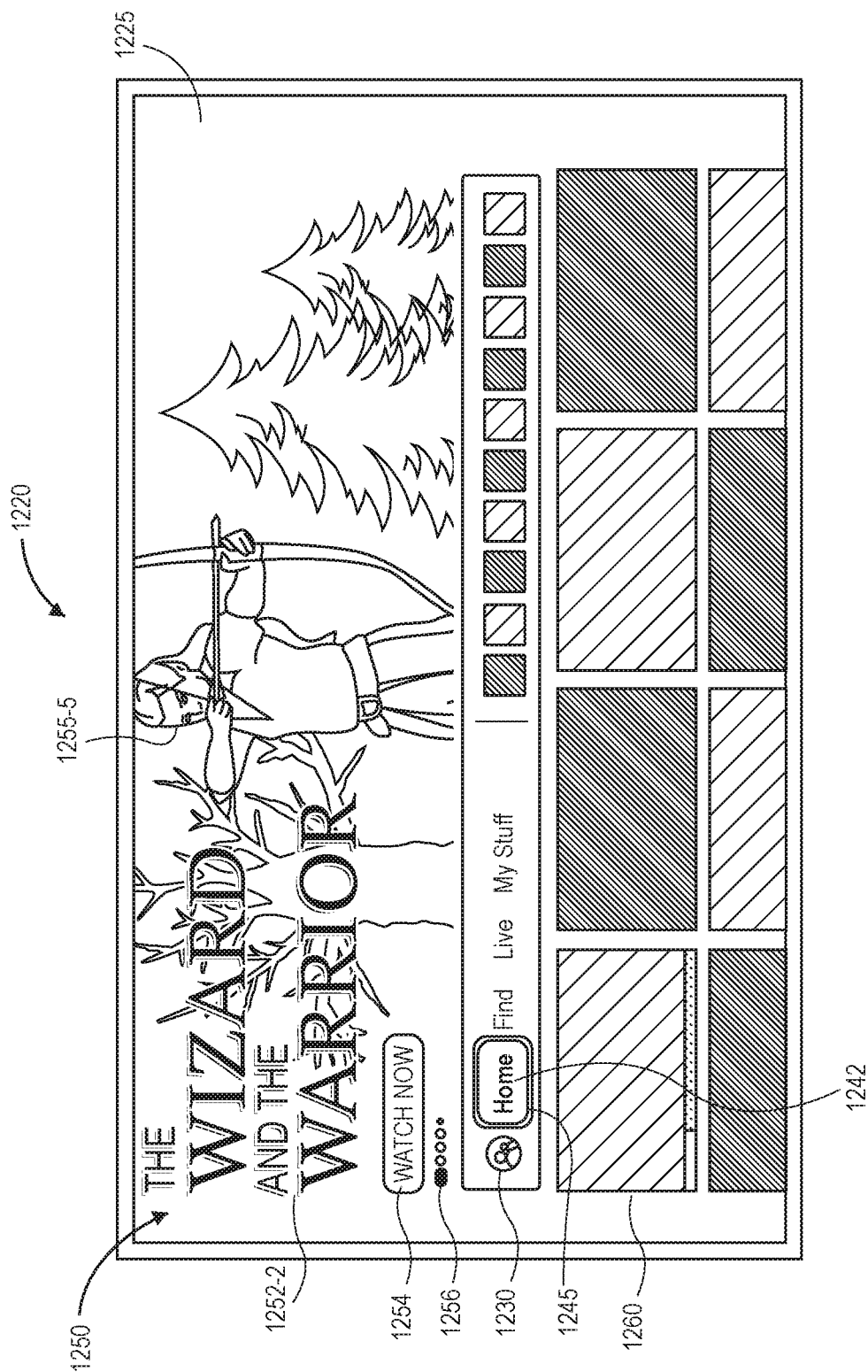

As is shown in FIG. 12E, when the user moves the cursor 1245 out of the first content section 1250, e.g., into the navigation bar 1230, the navigation bar 1230 rises from the bottom edge of the display 1225 to a substantially central location on the display 1225, and the first content section 1250 is condensed above the navigation bar 1230, while the second content section 1260 shown in FIG. 12A is then restored below the navigation bar 1230. Additionally, a representative image 1255-5 is shown in the first content section 1250 above the navigation bar 1230. The representative image 1255-5 may be a smaller or condensed version of the representative image 1255-4 shown in FIG. 12D, or a different image. Subsequently, the user may activate content associated with the representative images 1255-4, 1255-5 by moving the cursor 1245 into the first content section 1250 and selecting the call-to-action button 1254, or cause another representative image and information regarding different content available from another content source by moving the cursor 1245 onto an element within the navigation bar 1230 that corresponds to that content source.

Alternatively, the navigation bar 1230 may be displayed on or over any type or form of content as the content is rendered on a display, alone or with any other content, such as the call-to-action button 1254 or the delineation feature 1256. For example, the navigation bar 1230 may be displayed as content is being rendered in response to a request for a menu that is made or executed via one or more interactions with a personal device, e.g., a remote control thereof, or in any other manner.

Figure 13A:
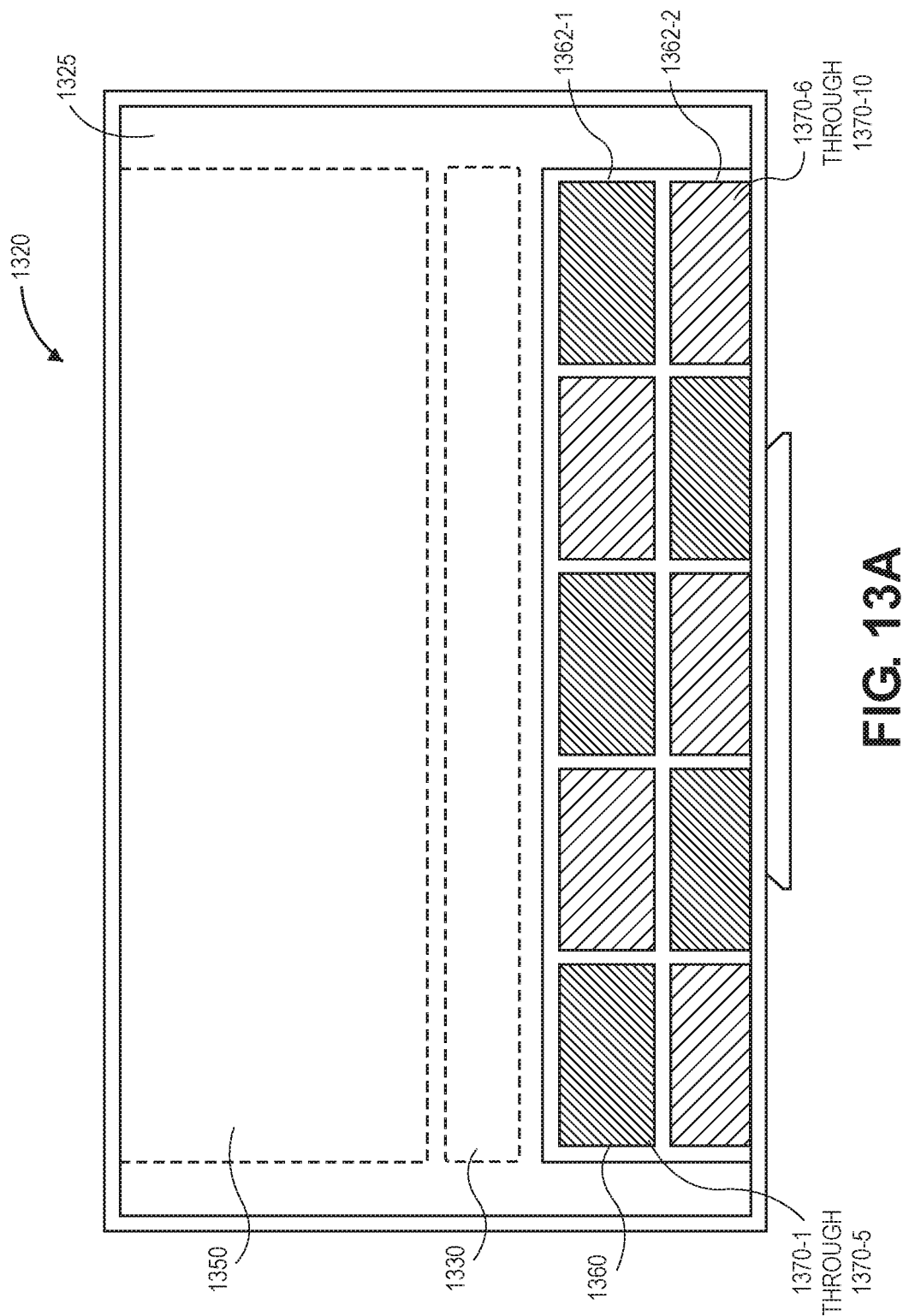
FIGS. 13A through 13C are views of aspects of one system for presenting options for selecting content in accordance with implementations of the present disclosure.
Figure 13B:
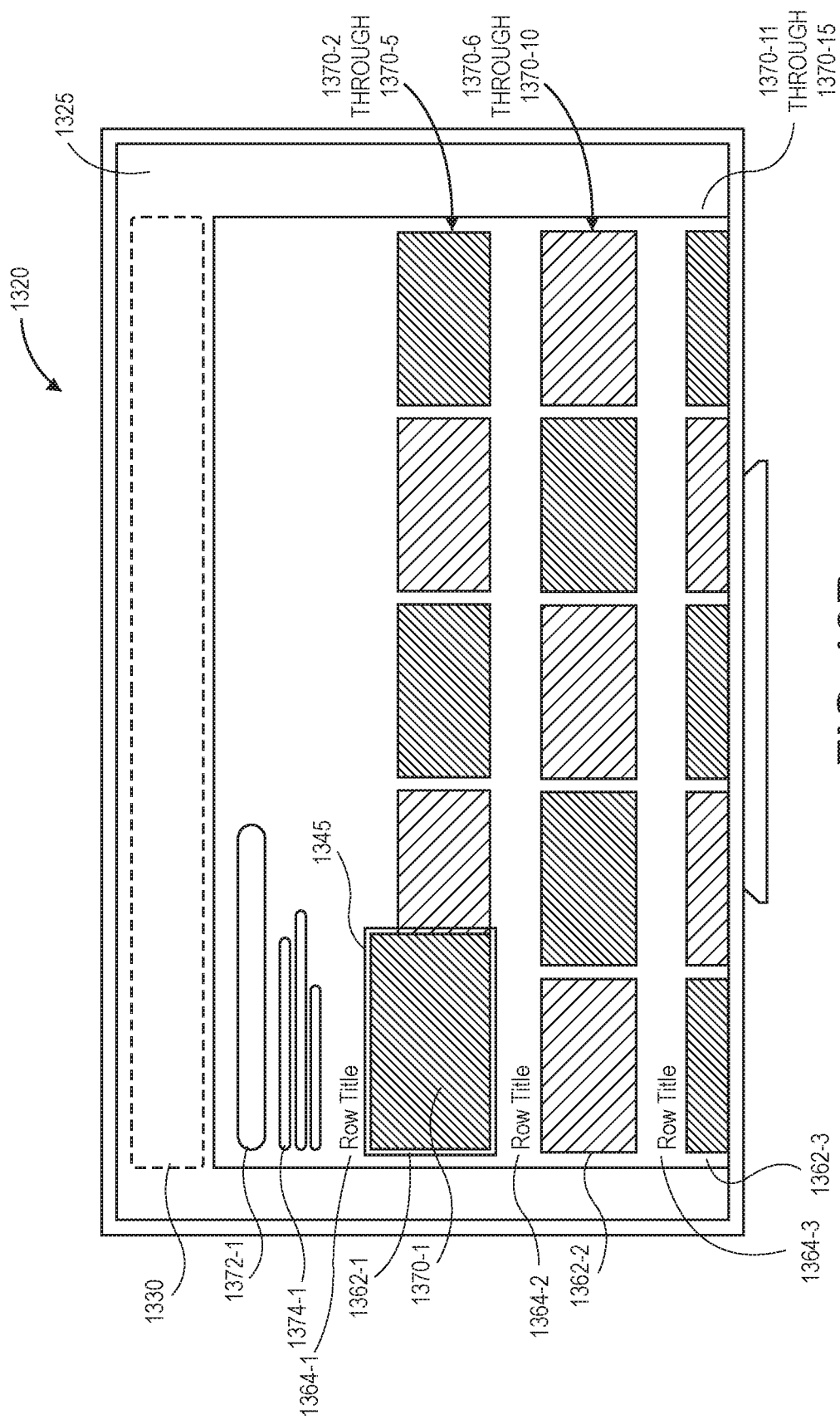
Figure 13C:
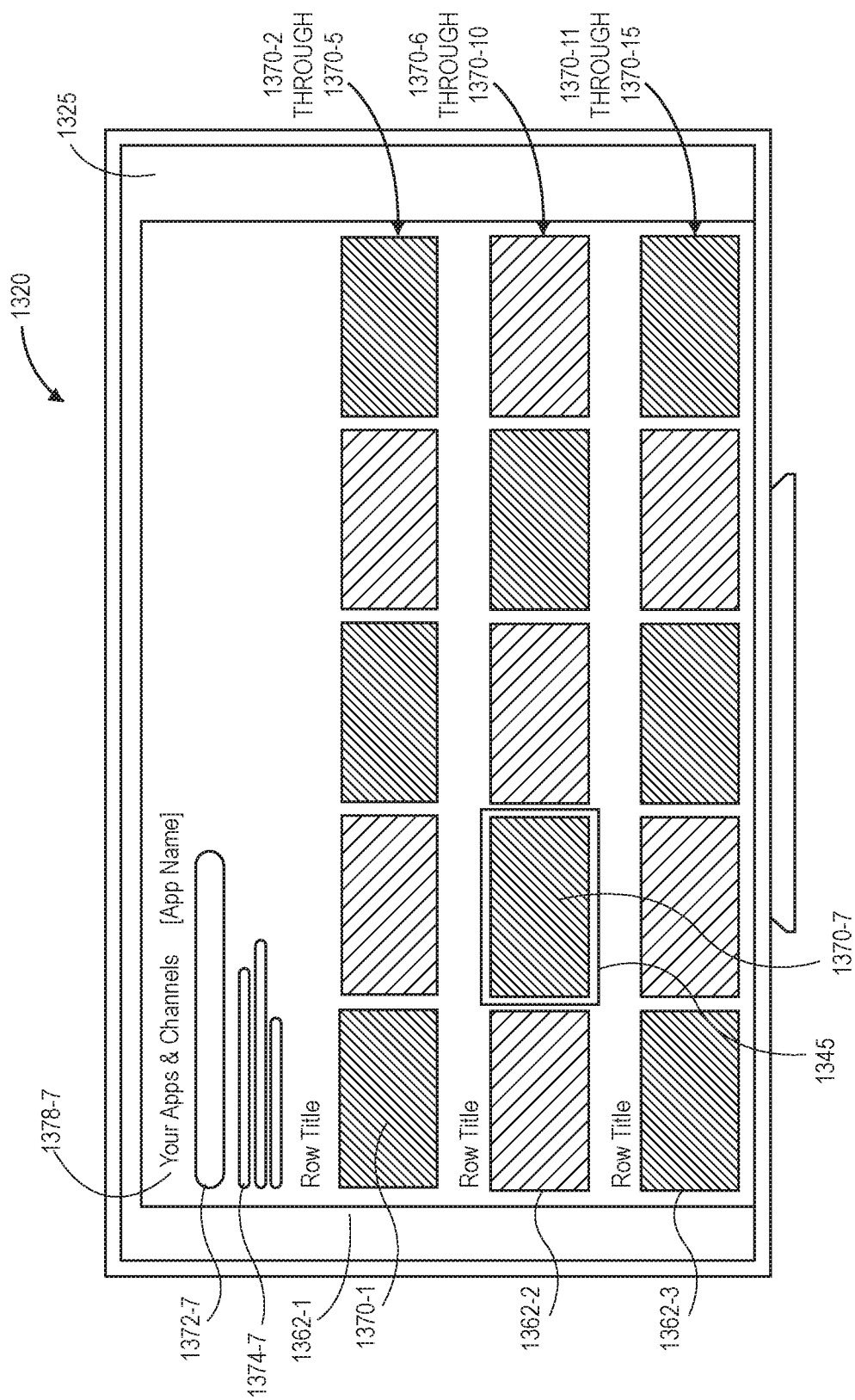

As is discussed above, a plurality of tiles including representative images of programs that are available for presentation on a personal device may be presented beneath a navigation bar on a display. Interactions with the tiles may cause the navigation bar to ascend to a top edge of the display, or to disappear from the display entirely, and be replaced with information or data regarding one or more of the programs. Referring to FIGS. 13A through 13C, views of aspects of one system for presenting options for selecting content in accordance with implementations of the present disclosure are shown.

As is shown in FIG. 13A, a personal device (e.g., a monitor or television) 1320 includes a display 1325 having a navigation bar 1330, a first content section (or area or space) 1350 above the navigation bar 1330 and a second content section (or area or space) 1360 below the navigation bar 1330. The personal device 1320 may be configured to receive content (e.g., media files of any type or form) from one or more networks, either directly or by way of a media streaming device (not shown). The navigation bar 1330 may be rendered on the display 1325 by one or more applications executed by one or more processors operating on the personal device 1320, or on a media streaming device (not shown) in communication with the personal device 1320. As is shown in FIG. 13A, the navigation bar 1330 is displayed substantially centrally across the display 1325, and in a horizontal orientation. Alternatively, the navigation bar 1330 may be rendered in any location on the display 1325, and in any orientation.

As is also shown in FIG. 13A, the second content space 1360 below the navigation bar 1330 includes a pair of rows of tiles including images corresponding to programs available from one or more content sources, including a plurality of tiles 1370-1 through 1370-5 arranged in a row 1362-1, and a plurality of tiles 1370-6 through 1370-10 arranged in a row 1362-2. The rows 1362-1, 1362-2 are aligned in parallel between the navigation bar 1330 and a bottom edge of the display 1325.

As is shown in FIG. 13B, when a user places a cursor (or another selection element) 1345 on a tile 1370-1, the navigation bar 1330-1 ascends to a top edge of the display 1325. Additionally, information regarding content (e.g., a program, a movie, a video game or other content) associated with the tile 1370-1 is rendered between the navigation bar 1330 and the row 1362-1 of the tiles 1370-1 through 1370-5. The information regarding the content associated with the tile 1370-1 includes a title 1372-1 and a description 1374-1 or summary of the content, and may also include ratings or summaries of the content, as well as a call-to-action button or other selectable feature (not shown) for activating the content. As is also shown in FIG. 13B, with the cursor 1345 on the tile 1370-1, the tile 1370-1 is enlarged or otherwise expanded in size with respect to the other tiles 1370-2 through 1370-5 or the other tiles 1370-6 through 1370-10. Moreover, as is further shown in FIG. 13B, another row 1362-3 of tiles 1370-11 through 1370-15 including images corresponding to programs available from the one or more content sources is also rendered on the display 1325, e.g., in parallel between the row 1362-2 and a bottom edge of the display 1325.

As is also shown in FIG. 13C, when the cursor 1345 is placed on a different tile 1370-7 within the row 1362-2, which is below the row 1362-1 including the tile 1370-1, the navigation bar 1330 disappears from view on the display 1325. The title 1372-1 of the content associated with the tile 1370-1 is replaced by a title 1370-7 of content associated with the tile 1370-7, and the description 1374-1 is replaced by a description 1374-7 of the content associated with the tile 1370-1. Moreover, a bread crumb 1378-7, or a navigation trail or aid, identifying a path or set of actions followed in order to cause the display 1325 to appear as shown in FIG. 13C, is also shown.

Figure 14:
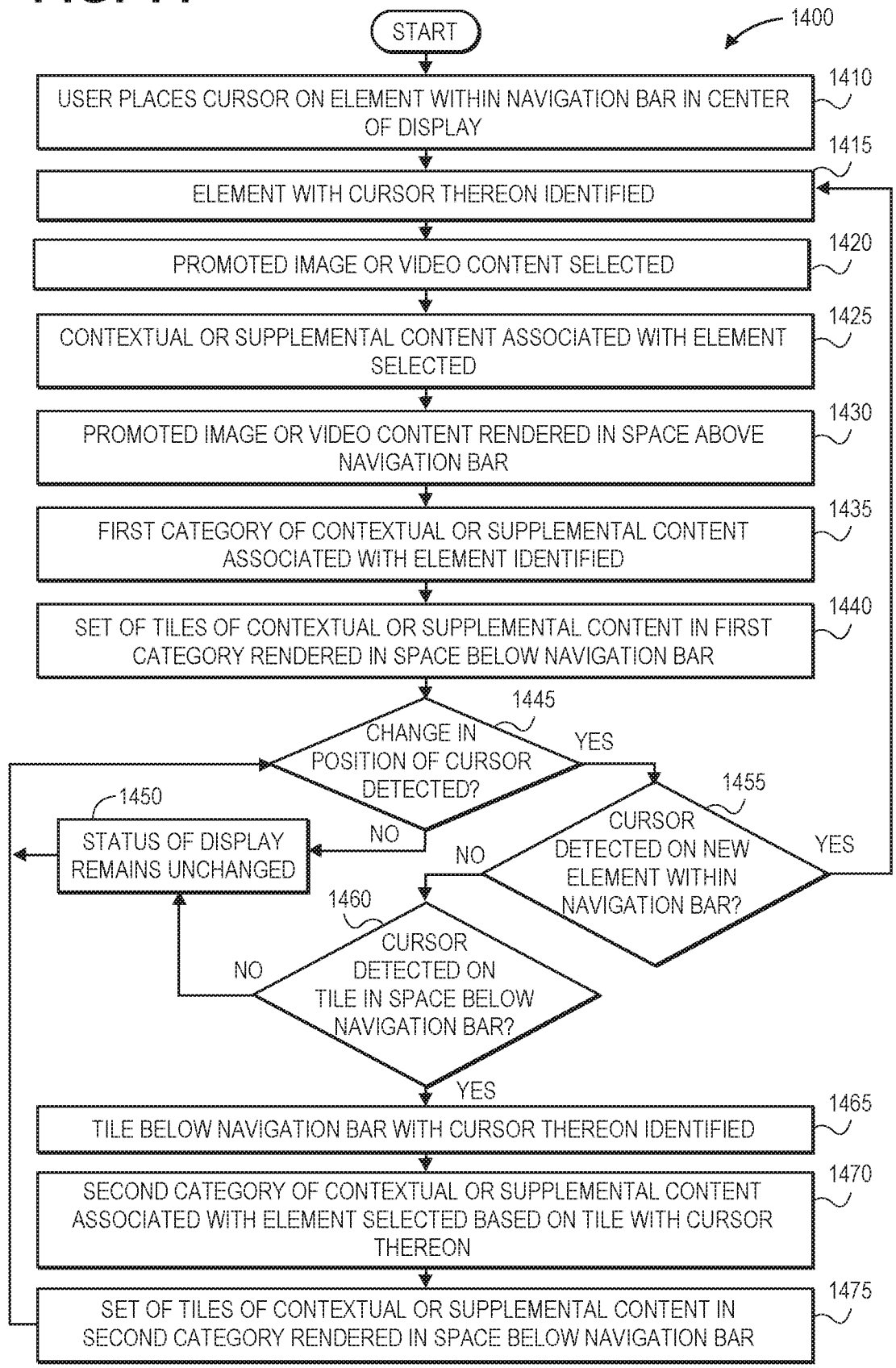
FIG. 14 is a flow chart of one process for presenting options for selecting content in accordance with implementations of the present disclosure.

Referring to FIG. 14 is a flow chart of one process for presenting options for selecting content in accordance with implementations of the present disclosure. At box 1410, a user places a cursor or another selection element on an element within a navigation bar rendered in a center of a display. For example, the navigation bar may include elements corresponding to browse destinations (e.g., menus or selectors for designating a user profile or performing one or more browsing or searching functions), content sources (e.g., applications, inputs, services or others, or for activating one or more utility applications), utility applications, or other applications, or any other elements, e.g., an expansion element. Alternatively, in some implementations, the navigation bar may be located at or aligned along an upper edge, a lower edge, a left edge, or a right edge of the display, or in any other location or orientation on the display.

At box 1415, the element having the cursor thereon is identified, and at box 1420, a promoted image or video content is selected. For example, an image or video content representative of an application or content source, a television program or network, a movie, a video game, an advertisement of any kind, an announcement, news, sports, weather, or any other information or any other media may be selected. At box 1425, contextual or supplemental content associated with the selected element is also selected. The contextual or supplemental content may include any number of programs or media files associated with an application or content source corresponding to the element having the cursor thereon, and may be sorted or grouped into one or more categories, e.g., drama, comedies, Westerns, documentaries, baseball games, live concerts, or others.

At box 1430, the promoted image or video content is rendered in a space above the navigation bar, e.g., as a single image or one or more images, and optionally along with one or more labels, descriptions, calls-to-action, or any other information regarding the promoted image or video content. At box 1435, a first category of the contextual or supplemental content associated with the element is identified. For example, where the element corresponds to an application or content source for viewing sporting events, news or other media, the category may be or relate to a sport, a team, a league, an event, a championship, a player, or any other category. Where the element corresponds to an application or content source for viewing television programs, the category may be or relate to a show, a series, a mini-series, a network, an actor or actress, a theme, or any other category. Where the element corresponds to an application or content source for listening to music files or watching music videos, the category may be or relate to a song, an album, an artist or group, a genre, or any other category. The first category may be any other division, subset or group of the contextual or supplemental content associated with the selected element.

At box 1440, a set of tiles of the contextual or supplemental content in the first category is rendered in the space below the navigation bar, e.g., in a common row or other section of the space. For example, the set of tiles may depict screen shots, representative images or any other visual descriptions of individual sets of the contextual or supplemental content in the first category. In some implementations, each of the tiles may be shown along with one or more labels or other identifiers.

At box 1445, whether a change in a position of the cursor has been detected is determined. If no change has been detected, then the process advances to box 1450, where a status of the display remains unchanged, before returning to box 1445. If a change has been detected, then the process advances to box 1455, where whether the cursor is detected on a new element within the navigation bar is determined. If the cursor is detected on a new element, then the process returns to box 1415, where the element with the cursor thereon is identified. If the cursor is not detected on a new element within the navigation bar, then the process advances to box 1460, where whether the cursor is detected on one of the tiles in the set within the space below the navigation bar is determined. If the cursor is not detected on a tile in the space below the navigation bar, e.g., if the cursor is on an element corresponding to a browse destination, a utility application, or another aspect on the display, then the process returns to box 1450, where the status of the display remains unchanged, before returning to box 1445.

If the cursor is detected on a tile in the space below the navigation bar, however, then the process advances to box 1465, where the tile below the navigation bar with the cursor thereon is identified. For example, as is discussed above, the tiles of contextual or supplemental content rendered below the navigation bar are within a first category, and the specific one of the tiles having the cursor thereon may be associated with one or more discrete aspects of an application or content source. At box 1470, a second category of the contextual or supplemental content associated with the element is selected based on the tile having the cursor thereon. For example, the second category may be a subset of the first category, or may be related or similar to the first category, and may be selected based on not only the application or content source corresponding to the element, but also any intrinsic or extrinsic information or data regarding the user, which may be obtained from any source, such as a prior search history or purchasing history (e.g., from a video-on-demand service or an online marketplace), from one or more social network postings, or in any other manner.

At box 1475, a set of tiles of the contextual or supplemental content in the second category is rendered in the space below the navigation bar, before returning to box 1445, where whether a change in a position of the cursor has been detected is determined. For example, the set of tiles of the contextual or supplemental content in the second category may be displayed, in whole or in part, directly below the set of tiles of the contextual or supplemental content in the first category or in any other location or orientation. Alternatively, or additionally, the navigation bar may ascend to a top edge of the display prior to or concurrent with the display of the set of tiles of the contextual or supplemental content in the second category.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations described herein or shown in the accompanying figures refer to the display of television programs, movies, sporting events, news or music programming on televisions or monitors, the systems and methods disclosed herein are not so limited, and content may be presented on any type or form of personal device, including but not limited to computers, telephones or any other devices having one or more displays and, optionally, audio speakers.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 5, 9 or 14, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or two left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A media streaming device connected to a television display, wherein the media streaming device comprises:
   at least one computer processor;
   a data store; and
   a transceiver,
   wherein the data store has instructions stored thereon that, when executed by the at least one computer processor, cause the media streaming device to perform a method comprising:
      rendering a navigation bar in an interface on the television display,
         wherein the navigation bar comprises a first plurality of selectable elements and a second plurality of selectable elements,
         wherein each of the first plurality of selectable elements corresponds to a function for operating at least one of the media streaming device or the television display, and
         wherein each of the second plurality of selectable elements corresponds to one of a plurality of applications for presenting content on the television display;
      identifying information regarding a first program available for presentation on the television display via at least one of the plurality of applications, wherein the information regarding the first program comprises:
         a first image associated with the first program;
         a title of the first program;
         a rating of the first program; and
         a description of the first program;
      rendering the first information in a first space above the navigation bar on the television display;
      determining that a cursor is located on a first selectable element corresponding to a first application for presenting content on the television display, wherein the first selectable element is one of the second plurality of selectable elements;
      in response to determining that the cursor is located on the first selectable element,
         selecting a first plurality of images, wherein each of the first plurality of images relates to one of a plurality of programs available for presentation on the television display via the first application; and
         rendering a first plurality of tiles below the navigation bar on the television display, wherein each of the first plurality of tiles includes one of the first plurality of images; and
      in response to determining that the cursor is located on the one of the first plurality of tiles,
         rendering the navigation bar at a top edge of the interface on the television display;
         selecting a second plurality of images, wherein each of the second plurality of images relates to one of a plurality of programs available for presentation on the television display via the second application; and
         rendering a second plurality of tiles below the navigation bar on the television display, wherein each of the second plurality of tiles includes one of the second plurality of images.

2. The media streaming device of claim 1, wherein the method further comprises:
   determining that the cursor is located on a second selectable element corresponding to a second application for presenting content on the television display, and wherein the second selectable element is one of the second plurality of elements; and
   in response to determining that the cursor is located on the second selectable element,
      selecting a second plurality of images, wherein each of the second plurality of images relates to one of a plurality of programs available for presentation on the television display via the second application; and
      rendering a second plurality of tiles below the navigation bar on the television display, wherein each of the second plurality of tiles includes one of the second plurality of images.

3. A computer-implemented method comprising:
   causing a display of a first navigation bar on a display of a personal device at a first time, wherein the first navigation bar is displayed in a horizontal orientation on the display of the personal device, and wherein the first navigation bar comprises:
  a first element within the first navigation bar, wherein the first element corresponds to a first function for operating the personal device or a device in communication with the personal device; and
  a second element within the first navigation bar, wherein the second element corresponds to a first application for presenting content by the personal device, and wherein the first application is associated with a first content source;
causing a display of first information in a first space above the first navigation bar at approximately the first time, wherein the first information comprises at least a first image; and
causing a display of a first plurality of tiles in a second space below the first navigation bar at approximately the first time, wherein each of the first plurality of tiles comprises at least one image corresponding to one of a plurality of programs available from the first content source for presentation by the personal device via the first application;
determining that the selection element is located in the first space at a second time, wherein the second time follows the first time; and
in response to determining that the selection element is located in the first space at the second time,
  causing a display of the first navigation bar adjacent a bottom edge of the display at approximately the second time, and wherein the display of the first navigation bar adjacent the bottom edge of the display causes the first space to occupy a balance of the display.

4. The computer-implemented method of claim 3, wherein the first navigation bar further comprises a third element within the first navigation bar,
wherein the third element corresponds to a second application for presenting content by the personal device,
wherein the second application is associated with a second content source, and
wherein the computer-implemented method further comprises:
determining that the selection element is located on the third element at a third time, wherein the third time follows the second time;
identifying a plurality of images, wherein each of the plurality of images corresponding to one of a plurality of programs is available from the second content source for presentation by the personal device via the second application; and
causing a display of a second plurality of tiles in the second space below the first navigation bar at approximately the third time, wherein each of the second plurality of tiles comprises at least one of the plurality of images.

5. The computer-implemented method of claim 3, wherein the display of the first navigation bar on the display of the personal device is caused by at least one of:
an application executed by one or more processors of the personal device; or
an application executed by one or more processors of the device in communication with the personal device.

6. The computer-implemented method of claim 5, wherein the first content source is in communication with one or more of the personal device or the device in communication with the personal device via one or more of:

a broadcast television network;
a cable television network;
a cellular telephone network;
another personal device;
at least one satellite;
at least one server; or
at least one content streaming service.

7. The computer-implemented method of claim 5, wherein the device is in communication with the personal device via one or more of an HDMI protocol, a CEC protocol or a Wireless Fidelity protocol.

8. The computer-implemented method of claim 5, further comprising:
receiving an interaction with the navigation bar from a user, wherein the interaction is one of:
  contact with a remote control in communication with at least one of the personal device or the device in communication with the personal device;
  contact with at least a portion of the personal device or the device in communication with the personal device; or
  a command to a voice-activated application associated with at least one of the personal device or the device in communication with the personal device, and
in response to the interaction,
  causing the selection element to be placed on the second element; and
  causing the display of the first plurality of tiles in the second space below the first navigation bar.

9. A computer-implemented method comprising:
causing a display of a first navigation bar on a display of a personal device at a first time, wherein the first navigation bar is displayed in a horizontal orientation on the display of the personal device, and wherein the first navigation bar comprises:
  a first element within the first navigation bar, wherein the first element corresponds to a first function for operating the personal device or a device in communication with the personal device; and
  a second element within the first navigation bar, wherein the second element corresponds to a first application for presenting content by the personal device, wherein the first application is associated with a first content source, and wherein a selection element is located on the second element at the first time;
causing a display of first information in a first space above the first navigation bar at approximately the first time, wherein the first information comprises at least a first image;
causing a display of a first plurality of tiles in a second space below the first navigation bar at approximately the first time, wherein each of the first plurality of tiles comprises at least one image corresponding to one of a plurality of programs available from the first content source for presentation by the personal device via the first application;
determining that the selection element is located in the second space at a second time, wherein the second time follows the first time;
in response to determining that the selection element is located in the second space at the second time,
  causing a display of the first navigation bar adjacent a top edge of the display at approximately the second time, wherein the display of the first navigation bar adjacent the top edge of the display causes the second space to occupy a balance of the display; and causing a display of a second plurality of tiles in the second space below the first plurality of tiles at approximately the second time, wherein each of the second plurality of tiles comprises at least one image corresponding to one of the plurality of programs available from the first content source for presentation by the personal device via the first application.

10. The computer-implemented method of claim 9, further comprising:
receiving a selection of a tile in the second space at a third time, wherein the tile is one of the first plurality of tiles or one of the second plurality of tiles, and wherein the third time follows the second time; and
in response to receiving the selection of the tile in the second space at the third time,
identifying a program corresponding to the selected tile, wherein the program corresponding to the selected tile is available for presentation by the personal device via the first application;
identifying second information regarding the program corresponding to the selected tile, wherein the second information comprises:
a second label associated with the second program corresponding to the selected tile;
a rating of the second program corresponding to the selected tile; or
a description of the second program corresponding to the selected tile;
causing the first navigation bar to be removed from the display; and
causing a display of at least a portion of the second information above the first plurality of tiles.

11. A computer-implemented method comprising:
causing a display of a first navigation bar on a display of a personal device at a first time, wherein the first navigation bar is displayed in a horizontal orientation on the display of the personal device, and wherein the first navigation bar comprises:
a first zone for accommodating elements corresponding to functions for operating the personal device or a device in communication with the personal device, wherein the first zone is aligned within the first navigation bar at a left end, and wherein a first element corresponding to a first function for operating the personal device or the device in communication with the personal device is within the first zone; and
a second zone for accommodating elements corresponding to applications for presenting content by the personal device, wherein the second zone is aligned within the first navigation bar adjacent the first zone, wherein each of the applications is associated with at least one content source, wherein a second element corresponding to a first application for presenting content by the personal device is within the second zone, and wherein the first application is associated with a first content source;
causing a display of first information in a first space above the first navigation bar at approximately the first time, wherein the first information comprises at least a first image; and
causing a display of a first plurality of tiles in a second space below the first navigation bar at approximately the first time, wherein each of the first plurality of tiles comprises at least one image corresponding to one of a plurality of programs available from the first content source for presentation by the personal device via the first application.

12. The computer-implemented method of claim 11, further comprising:
receiving a selection of the second element; and
in response to the selection of the second element,
causing the first navigation bar, the first information and the first plurality of tiles to be removed from the display; and
activating the first application.

13. The computer-implemented method of claim 11, further comprising:
receiving a selection of the first element at a second time, wherein the second time follows the first time; and
in response to receiving the selection of the first element at the second time,
executing the first function, wherein the first function is one of:
restoring the display to a default configuration;
accessing or selecting a user profile;
enabling a search for content available for presentation by the personal device;
enabling browsing of content available for presentation by the personal device; or
enabling access to previously purchased content.

14. The computer-implemented method of claim 11, wherein the second zone comprises a first plurality of elements arranged in an order associated with a user, and wherein the second element is one of the first plurality of elements.

15. The computer-implemented method of claim 14, wherein the order associated with the user is one of:
an order stored in a profile of the user; or
an order selected for the user, wherein the order selected for the user comprises:
at least one element corresponding to an application or an input corresponding to a content source that has paid a premium ahead of or to a left of at least one element corresponding to an application or an input selected by the user.

16. A computer-implemented method comprising:
causing a display of a first navigation bar on a display of a personal device at a first time, wherein the first navigation bar is displayed in a horizontal orientation on the display of the personal device, and wherein the first navigation bar comprises:
a first element within the first navigation bar, wherein the first element corresponds to a first function for operating the personal device or a device in communication with the personal device;
a second element within the first navigation bar, wherein the second element corresponds to a first application for presenting content by the personal device, and wherein the first application is associated with a first content source; and
a third element within the navigation bar,
wherein the third element is configured to toggle a display of a second navigation bar upon a selection of the third element,
wherein the second navigation bar comprises a plurality of elements,
wherein each of the plurality of elements within the second navigation bar corresponds to one of a plurality of applications for presenting content by the personal device, and wherein each of the applications is associated with a content source;

causing a display of first information in a first space above the first navigation bar at approximately the first time, wherein the first information comprises at least a first image; and causing a display of a first plurality of tiles in a second space below the first navigation bar at approximately the first time, wherein each of the first plurality of tiles comprises at least one image corresponding to one of a plurality of programs available from the first content source for presentation by the personal device via the first application.

17. The computer-implemented method of claim 16, further comprising:

receiving a selection of the second element; and in response to the selection of the second element,
causing the first navigation bar, the first information and the first plurality of tiles to be removed from the display; and
activating the first application.

18. The computer-implemented method of claim 16, further comprising:

receiving a selection of the first element at a second time, wherein the second time follows the first time; and in response to receiving the selection of the first element at the second time,
executing the first function, wherein the first function is one of:
restoring the display to a default configuration;
accessing or selecting a user profile;
enabling a search for content available for presentation by the personal device;
enabling browsing of content available for presentation by the personal device; or
enabling access to previously purchased content.

19. A television system comprising:
a display;
at least one computer processor;
a data store; and
a transceiver,
wherein the data store has instructions stored thereon that, when executed by the at least one computer processor, cause the television to perform a method comprising:
rendering a navigation bar in an interface on the display,
wherein the navigation bar comprises a first plurality of selectable elements and a second plurality of selectable elements,
wherein each of the first plurality of selectable elements corresponds to a function for operating the television system, and
wherein each of the second plurality of selectable elements corresponds to one of a plurality of applications for presenting content on the display;

identifying information regarding a first program available for presentation on the display via at least one of the plurality of applications, wherein the information regarding the first program comprises:
a first image associated with the first program;
a title of the first program;
a rating of the first program; and
a description of the first program;
rendering the first information in a first space above the navigation bar on the display;
determining that a selection element is located on a first selectable element corresponding to a first application for presenting content on the display, wherein the first selectable element is one of the second plurality of selectable elements;
in response to determining that the selection element is located on the first selectable element,
selecting a first plurality of images, wherein each of the first plurality of images relates to one of a plurality of programs available for presentation on the display via the first application; and
rendering a first plurality of tiles in at least one row below the navigation bar on the display, wherein each of the first plurality of tiles includes one of the first plurality of images; and
in response to determining that the cursor is located on the one of the first plurality of tiles,
rendering the navigation bar at a top edge of the interface on the television display;
selecting a second plurality of images, wherein each of the second plurality of images relates to one of a plurality of programs available for presentation on the television display via the second application; and
rendering a second plurality of tiles below the navigation bar on the television display, wherein each of the second plurality of tiles includes one of the second plurality of images.

20. The television system of claim 19, wherein the method further comprises:

determining that the selection element is located on a second selectable element corresponding to a second application for presenting content on the display, and wherein the second selectable element is one of the second plurality of elements; and in response to determining that the selection element is located on the second selectable element,
selecting a second plurality of images, wherein each of the second plurality of images relates to one of a plurality of programs available for presentation on the display via the second application; and
rendering a second plurality of tiles in at least one row below the navigation bar on the display, wherein each of the second plurality of tiles includes one of the second plurality of images.

* * * * *